US011627571B2

(12) United States Patent
Zhang et al.

(10) Patent No.: US 11,627,571 B2
(45) **Date of Patent: *Apr. 11, 2023**

(54) FEEDBACK WINDOW TO PROVIDE EARLY FEEDBACK FOR TRANSMISSIONS IN A SET OF CONSECUTIVE TRANSMISSION TIME INTERVALS

(71) Applicant: QUALCOMM Incorporated, San Diego, CA (US)

(72) Inventors: Xiaoxia Zhang, San Diego, CA (US); Juan Montojo, San Diego, CA (US); Kiran Venugopal, Raritan, NJ (US); Tianyang Bai, Somerville, NJ (US); Tao Luo, San Diego, CA (US); Makesh Pravin John Wilson, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 72 days.

This patent is subject to a terminal disclaimer.

(21) Appl. No.: 17/175,429

(22) Filed: Feb. 12, 2021

(65) Prior Publication Data

US 2021/0168797 A1 Jun. 3, 2021

Related U.S. Application Data

(63) Continuation of application No. 16/425,593, filed on May 29, 2019, now Pat. No. 10,932,259.

(Continued)

(51) Int. Cl.

| | |
|---|---|
| ***H04W 72/04*** | (2009.01) |
| ***H04W 72/14*** | (2009.01) |

(Continued)

(52) U.S. Cl.

CPC ....... *H04W 72/0446* (2013.01); *H04L 5/0055* (2013.01); *H04W 72/0406* (2013.01);

(Continued)

(58) Field of Classification Search

CPC ......... H04W 72/0446; H04W 72/0406; H04W 72/14; H04W 88/02; H04L 5/0055

See application file for complete search history.

(56) References Cited

U.S. PATENT DOCUMENTS

| | | | | |
|---|---|---|---|---|
| 9,019,882 | B2 * | 4/2015 | Bergquist | H04L 1/1896 370/311 |
| 10,574,406 | B2 * | 2/2020 | Wang | H04L 1/189 |

(Continued)

OTHER PUBLICATIONS

Ericsson: "Summary of Contributions on PUCCH structure in short-duration", 3GPP Draft; R1-1803431 , 3rd Generation Partnership Project (3GPP), Mobile Competence Centre; 650, Route Des Lucioles ; F-06921 Sophia-Antipolis Cedex; France, vol. RAN WG1, No. Athens, Greece; Feb. 26, 2018- Mar. 2, 2018, Mar. 1, 2018 (Mar. 1, 2018), XP051398647, 14 Pages, Retrieved from the Internet: URL:http://www.3gpp.org/ftp/tsg%5Fran/WG1%5FRL1/TSGR1%5F92/Docs/ [retrieved on Mar. 1, 2018], paragraph [03.3]—paragraph [03.4].

(Continued)

*Primary Examiner* — Chandrahas B Patel

(74) *Attorney, Agent, or Firm* — Danai Nelisile Mhembere; Holland & Hart LLP

(57) ABSTRACT

Methods, systems, and devices for wireless communications are described. A user equipment (UE) may receive an indicator of a feedback window that is offset relative to a beginning transmission time interval (TTI) of a set of consecutive TTIs. The consecutive TTIs may include a set of aggregated slots or may correspond to a multi-TTI grant. The feedback window may include multiple control channel occasions interspersed within a duration of the set of con- (Continued)

secutive TTIs. The UE may receive a transport block within a first TTI of the set of consecutive TTIs and transmit, within a control channel, feedback to indicate whether the transport block was successfully received.

28 Claims, 20 Drawing Sheets

Related U.S. Application Data

(60) Provisional application No. 62/680,804, filed on Jun. 5, 2018.

(51) Int. Cl.

| | |
|---|---|
| ***H04W 88/02*** | (2009.01) |
| ***H04L 5/00*** | (2006.01) |
| ***H04W 72/0446*** | (2023.01) |
| *H04L 1/18* | (2006.01) |
| *H04L 1/1812* | (2023.01) |

(52) U.S. Cl.
CPC .......... *H04W 72/14* (2013.01); *H04L 1/1812* (2013.01); *H04W 88/02* (2013.01)

(56) References Cited

U.S. PATENT DOCUMENTS

| | | | | |
|---|---|---|---|---|
| 10,624,127 | B2 | 4/2020 | Jonsson et al. | |
| 11,096,086 | B2 * | 8/2021 | Hong .................... | H04W 92/18 |
| 2019/0373607 | A1 | 12/2019 | Zhang et al. | |

OTHER PUBLICATIONS

Huawei et al., "Configuration on Type 1 Grant-Free for Active UE", 3GPP Draft; R2-1711430 Configuration on Type 1 Grant-Free for Active UE, 3rd Generation Partnership Project (3GPP), Mobile Competence Centre ; 650, Route Des Lucioles ; F-06921 Sophia-Antipolis Cedex, vol. RAN WG2, No. Prague, Czech Republic; Oct. 9, 2017-Oct. 13, 2017, Oct. 8, 2017 (Oct. 8, 2017), XP051343415, 7 Pages, Retrieved from the Internet: URL:http://www.3gpp.org/ftp/Meetings_3GPP_SYNC/RAN2/Docs/ [retrieved on Oct. 8, 2017], p. 3.

Huawei et al., "PDCCH repetition for URLLC", 3GPP Draft; R1-1803658, 3rd Generation Partnership Project (3GPP), Mobile Competence Centre ; 650, Route Des Lucioles; F-06921 Sophia-Antipolis Cedex; France, vol. RAN WG1, No. Sanya, China; Apr. 16, 2018-Apr. 20, 2018, Apr. 15, 2018 (Apr. 15, 2018), XP051425955, 9 Pages, Retrieved from the Internet: URL:http://www.3gpp.org/ftp/Meetings%5F3GPP%5FSYNC/RAN1/Docs/ [retrieved on Apr. 15, 2018], paragraph [2.2.1].

International Search Report and Written Opinion—PCT/US2019/034555—ISA/EPO—dated Aug. 16, 2019.

LG Electronics: "Discussion on early termination of uplink repetitions for MTC", 3GPP Draft; R1-1804518, 3rd Generation Partnership Project (3GPP), Mobile Competence Centre ; 650, Route Des Lucioles; F-06921 Sophia-Antipolis Cedex; France, vol. RAN WG1, No. Sanya, China; Apr. 16, 2018-Apr. 20, 2018, Apr. 15, 2018 (Apr. 15, 2018), XP051426788, 3 Pages, Retrieved from the Internet: URL:http://www.3gpp.org/ftp/Meetings%5F3GPP%5FSYNC/RAN1/Docs/ [retrieved on Apr. 15, 2018], p. 2.

LG Electronics: "UL control related techniques for LTE URLLC", 3GPP Draft; R1-1802182 PUCCH LTE URLLC, 3rd Generation Partnership Project (3GPP), Mobile Competence Centre ; 650, Route Des Lucioles ; F-06921 Sophia-Antipolis Cedex ; France, vol. RAN WG1, No. Athens, Greece; Feb. 26, 2018-Mar. 2, 2018, Feb. 16, 2018 (Feb. 16, 2018), XP051397187, 3 Pages, Retrieved from the Internet: URL:http://www.3gpp.org/ftp/tsg%5Fran/WG1%5FRL1/TSGR1%5F92/Docs/ [retrieved on Feb. 16, 2018], paragraph [8882].

NTT DOCOMO et al., "Views on UL HARQ-ACK feedback design", 3GPP Draft; R1-1805026 Views on UL HARQ-ACK Feedback Design, 3rd Generation Partnership Project (3GPP), Mobile Competence Centre ; 650, Route Des Lucioles ; F-06921 Sophia-Antipolis Cedex ; France, vol. RAN WG1, No. Sanya, China; Apr. 16, 2018-Apr. 20, 2018, Apr. 15, 2018 (Apr. 15, 2018), XP051427287, 3 Pages, Retrieved from the Internet: URL:http://www.3gpp.org/ftp/Meetings%5F3GPP%5FSYNC/RAN1/Docs/ [retrieved on Apr. 15, 2018], p. 2.

NTT DOCOMO et al., "DL/UL Scheduling and HARQ Management", 3GPP TSG RAN WG1 Meeting 90bis, 3GPP Draft; R1-1718217, 3rd Generation Partnership Project (3GPP), Mobile Competence Centre, 650, Route Des Lucioles, F-06921 Sophia-Antipolis Cedex, France, vol. RAN WG1, No. Prague. CZ; Oct. 9, 2017-Oct. 13, 2017, Oct. 3, 2017 (Oct. 3, 2017), pp. 1-14, XP051352925, Retrieved from the Internet: URL: http://www.3gpp.org/ftp/tsg_ran/WG1_RL1/TSGR1_90b/Docs [retrieved on Oct. 3, 2017].

Sony: "Remaining issues in explicit uplink HARQ-ACK feedback", 3GPP Draft; R1-1807245—REL-15 EFEMTC—Explicit HARQ-ACK V02, 3rd Generation Partnership Project (3GPP), Mobile Competence Centre ; 650, Route Des Lucioles ; F-06921 Sophia-Antipolis Cedex ; France, vol. RAN WG1, No. Busan, Korea; May 21, 2018-May 25, 2018, May 20, 2018 (May 20, 2018), XP051442441, 6 Pages, Retrieved from the Internet: URL:http://www.3gpp.org/ftp/Meetings%5F3GPP%5FSYNC/RAN1/Docs/ [retrieved on May 20, 2018], p. 2-p. 4.

* cited by examiner

200

FEEDBACK WINDOW TO PROVIDE EARLY FEEDBACK FOR TRANSMISSIONS IN A SET OF CONSECUTIVE TRANSMISSION TIME INTERVALS

CROSS REFERENCES

The present application for patent is a Continuation of U.S. patent application Ser. No. 16/425,593 by Zhang et al., entitled "FEEDBACK WINDOW TO PROVIDE EARLY FEEDBACK FOR TRANSMISSIONS IN A SET OF CONSECUTIVE TRANSMISSION TIME INTERVALS" filed May 29, 2019, which claims the benefit of U.S. Provisional Patent Application No. 62/680,804 by Zhang et al., entitled "FEEDBACK WINDOW TO PROVIDE EARLY FEEDBACK FOR TRANSMISSIONS IN A SET OF CONSECUTIVE TRANSMISSION TIME INTERVALS," filed Jun. 5, 2018, assigned to the assignee hereof, and expressly incorporated by reference herein.

BACKGROUND

The following relates generally to wireless communications, and more specifically to a feedback window for providing early feedback for transmissions in a set of consecutive transmission time intervals.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

A base station in some Long Term Evolution (LTE) or New Radio (NR) deployments may allocate time and frequency resources in one or more transmission time intervals (TTIs) to a UE in which to receive a downlink transmission, to transmit an uplink transmission, or both. LTE and NR systems provide for a multi-TTI grant that may allocate resources in multiple consecutive TTIs to a same UE. Some NR systems provide for communication using slot aggregation, in which a base station may grant a UE resources in a set of consecutive slots. In some cases, a same transport block (TB) may be communicated in each slot of the multiple aggregated slots to provide a better link budget and increase the likelihood that the TB is successfully received.

Communication reliability may be enhanced through feedback mechanisms that may provide for retransmission of unsuccessfully received transmissions, such as according to hybrid acknowledgment repeat request (HARQ) feedback techniques, for example. In HARQ, a receiver, such as a UE or base station, may attempt to decode a transmission and send feedback indicating whether the receiver could successfully decode the transmission. Conventional feedback techniques may be deficient.

SUMMARY

The described techniques relate to improved methods, systems, devices, or apparatuses that support a feedback window to provide early feedback for transmissions using slot aggregation or multi-transmission time interval (multi-TTI) grants. Generally, the described techniques enable a user equipment (UE) or a base station to provide early feedback information (e.g., acknowledgment (ACK) or negative acknowledgment (NACK) information) within a feedback window that includes a set of control channel occasions interspersed within a duration of a set of consecutive TTIs. The set of consecutive TTIs may be a set of aggregated slots having a duration configured via radio resource control (RRC) signaling, or may correspond to a multi-TTI grant. The feedback window may be offset relative to a beginning TTI of the set of consecutive TTIs. The UE or base station may use at least one of the control channel occasions to provide early feedback on whether a transport block is successfully received within one of the TTIs, rather than waiting to provide feedback until after a last TTI of the set of consecutive TTIs. Beneficially, the techniques described herein may provide for reallocation of at least a later one of the consecutive TTIs when the feedback indicates successful receipt of a transport block in one of the earlier one of the consecutive TTIs, as well as reducing retransmission latency by permitting earlier retransmission of at least a portion of a transport block in a later one of the consecutive TTIs that the feedback indicates was not successfully received in an earlier one of the consecutive TTIs.

A method of wireless communication by a UE is described. The method may include receiving an indicator of a feedback window that is offset relative to a beginning TTI of a set of consecutive TTIs, the feedback window including a set of control channel occasions interspersed within a duration of the set of consecutive TTIs, receiving a transport block within a first TTI of the set of consecutive TTIs, and transmitting, within a first control channel occasion of the set of control channel occasions, feedback to indicate whether the transport block was successfully received.

An apparatus for wireless communication by a UE is described. The apparatus may include a processor, memory in electronic communication with the processor, and instructions stored in the memory. The instructions may be executable by the processor to cause the apparatus to receive an indicator of a feedback window that is offset relative to a beginning TTI of a set of consecutive TTIs, the feedback window including a set of control channel occasions interspersed within a duration of the set of consecutive TTIs, receive a transport block within a first TTI of the set of consecutive TTIs, and transmit, within a first control channel occasion of the set of control channel occasions, feedback to indicate whether the transport block was successfully received.

Another apparatus for wireless communication by a UE is described. The apparatus may include means for receiving an indicator of a feedback window that is offset relative to a beginning TTI of a set of consecutive TTIs, the feedback window including a set of control channel occasions interspersed within a duration of the set of consecutive TTIs, receiving a transport block within a first TTI of the set of consecutive TTIs, and transmitting, within a first control channel occasion of the set of control channel occasions, feedback to indicate whether the transport block was successfully received.

A non-transitory computer-readable medium storing code for wireless communication by a UE is described. The code may include instructions executable by a processor to receive an indicator of a feedback window that is offset relative to a beginning TTI of a set of consecutive TTIs, the feedback window including a set of control channel occasions interspersed within a duration of the set of consecutive TTIs, receive a transport block within a first TTI of the set of consecutive TTIs, and transmit, within a first control channel occasion of the set of control channel occasions, feedback to indicate whether the transport block was successfully received.

Some examples of the method, apparatuses, and non-transitory computer-readable medium described herein may further include operations, features, means, or instructions for determining not to transmit the feedback within any subsequent control channel occasion of the set of control channel occasions that occur after the first control channel occasion.

Some examples of the method, apparatuses, and non-transitory computer-readable medium described herein may further include operations, features, means, or instructions for discontinuing monitoring a second TTI that occurs after the first TTI for the transport block based on the feedback including an acknowledgment.

Some examples of the method, apparatuses, and non-transitory computer-readable medium described herein may further include operations, features, means, or instructions for monitoring a second TTI of the set of consecutive TTIs that occurs after the first TTI for a second transport block.

Some examples of the method, apparatuses, and non-transitory computer-readable medium described herein may further include operations, features, means, or instructions for receiving the second transport block in the second TTI and transmitting, within a second control channel occasion of the set of control channel occasions that occurs after the first control channel occasion, an acknowledgment to indicate successful receipt of the second transport block.

Some examples of the method, apparatuses, and non-transitory computer-readable medium described herein may further include operations, features, means, or instructions for transmitting, within a second control channel occasion of the set of control channel occasions that occurs after to the first control channel occasion, a negative acknowledgment to indicate unsuccessful receipt of the second transport block.

Some examples of the method, apparatuses, and non-transitory computer-readable medium described herein may further include operations, features, means, or instructions for receiving a second indicator that indicates the duration of the set of consecutive TTIs, where the set of consecutive TTIs may be a set of aggregated TTIs.

In some examples of the method, apparatuses, and non-transitory computer-readable medium described herein, the feedback includes an acknowledgment to indicate successful receipt of the transport block.

In some examples of the method, apparatuses, and non-transitory computer-readable medium described herein, the feedback indicates whether a set of transport blocks including the transport block were successfully received.

In some examples of the method, apparatuses, and non-transitory computer-readable medium described herein, the feedback includes a negative acknowledgment to indicate unsuccessful receipt of the transport block.

Some examples of the method, apparatuses, and non-transitory computer-readable medium described herein may further include operations, features, means, or instructions for transmitting delta channel state information within the first control channel occasion.

Some examples of the method, apparatuses, and non-transitory computer-readable medium described herein may further include operations, features, means, or instructions for transmitting, within a second control channel occasion of the set of control channel occasions that occurs prior to the first control channel occasion, a negative acknowledgment to indicate unsuccessful receipt of the transport block in a second TTI that occurs prior to the first TTI.

Some examples of the method, apparatuses, and non-transitory computer-readable medium described herein may further include operations, features, means, or instructions for receiving a grant indicating the beginning TTI of the set of consecutive TTIs and allocation of resources within each TTI of the set of consecutive TTIs.

Some examples of the method, apparatuses, and non-transitory computer-readable medium described herein may further include operations, features, means, or instructions for transmitting a capability indicator to a base station, where a time period between the grant and the beginning TTI may be based on the capability indicator.

Some examples of the method, apparatuses, and non-transitory computer-readable medium described herein may further include operations, features, means, or instructions for performing clear channel assessment on a shared radio frequency spectrum band prior to transmitting the feedback within the first control channel occasion.

Some examples of the method, apparatuses, and non-transitory computer-readable medium described herein may further include operations, features, means, or instructions for receiving the transport block in a subset of TTIs of the set of consecutive TTIs.

Some examples of the method, apparatuses, and non-transitory computer-readable medium described herein may further include operations, features, means, or instructions for transmitting, within a control channel of a TTI occurring after the set of consecutive TTIs, channel state information and second feedback.

Some examples of the method, apparatuses, and non-transitory computer-readable medium described herein may further include operations, features, means, or instructions for receiving a second indicator that associates a respective redundancy version of a set of redundancy versions of the transport block with a respective TTI of the set of consecutive TTIs.

Some examples of the method, apparatuses, and non-transitory computer-readable medium described herein may further include operations, features, means, or instructions for monitoring for a different redundancy version of the transport block in at least two TTIs of the set of consecutive TTIs.

A method of wireless communication by a UE is described. The method may include receiving an indicator of a feedback window that is offset relative to a beginning TTI of a set of consecutive TTIs, the feedback window including a set of control channel occasions interspersed within a duration of the set of consecutive TTIs, transmitting a transport block within a first TTI of the set of consecutive TTIs, and receiving, within a first control channel occasion of the set of control channel occasions, feedback indicating whether the transport block was successfully received.

An apparatus for wireless communication by a UE is described. The apparatus may include a processor, memory in electronic communication with the processor, and instructions stored in the memory. The instructions may be executable by the processor to cause the apparatus to receive an indicator of a feedback window that is offset relative to a beginning TTI of a set of consecutive TTIs, the feedback window including a set of control channel occasions interspersed within a duration of the set of consecutive TTIs, transmit a transport block within a first TTI of the set of consecutive TTIs, and receive, within a first control channel occasion of the set of control channel occasions, feedback indicating whether the transport block was successfully received.

Another apparatus for wireless communication by a UE is described. The apparatus may include means for receiving an indicator of a feedback window that is offset relative to a beginning TTI of a set of consecutive TTIs, the feedback window including a set of control channel occasions interspersed within a duration of the set of consecutive TTIs, transmitting a transport block within a first TTI of the set of consecutive TTIs, and receiving, within a first control channel occasion of the set of control channel occasions, feedback indicating whether the transport block was successfully received.

A non-transitory computer-readable medium storing code for wireless communication by a UE is described. The code may include instructions executable by a processor to receive an indicator of a feedback window that is offset relative to a beginning TTI of a set of consecutive TTIs, the feedback window including a set of control channel occasions interspersed within a duration of the set of consecutive TTIs, transmit a transport block within a first TTI of the set of consecutive TTIs, and receive, within a first control channel occasion of the set of control channel occasions, feedback indicating whether the transport block was successfully received.

Some examples of the method, apparatuses, and non-transitory computer-readable medium described herein may further include operations, features, means, or instructions for determining not to retransmit the transport block in a subsequent TTI of the set of consecutive TTIs based on the feedback.

Some examples of the method, apparatuses, and non-transitory computer-readable medium described herein may further include operations, features, means, or instructions for determining to retransmit, within a subsequent TTI of the consecutive set of TTIs, the transport block based on the feedback.

Some examples of the method, apparatuses, and non-transitory computer-readable medium described herein may further include operations, features, means, or instructions for determining to retransmit, within a subsequent TTI of the consecutive set of TTIs, at least one code block or code block group of the transport block based on the feedback.

Some examples of the method, apparatuses, and non-transitory computer-readable medium described herein may further include operations, features, means, or instructions for transmitting the transport block in each TTI of the set of TTIs that occurs prior to the first control channel occasion.

Some examples of the method, apparatuses, and non-transitory computer-readable medium described herein may further include operations, features, means, or instructions for scheduling to transmit at least two different transport blocks in the set of consecutive TTIs.

Some examples of the method, apparatuses, and non-transitory computer-readable medium described herein may further include operations, features, means, or instructions for receiving a grant indicating the beginning TTI of the set of consecutive TTIs and allocation of resources within each TTI of the set of consecutive TTIs.

Some examples of the method, apparatuses, and non-transitory computer-readable medium described herein may further include operations, features, means, or instructions for transmitting a capability indicator to a base station, where a time period between the grant and the beginning TTI may be based on the capability indicator.

Some examples of the method, apparatuses, and non-transitory computer-readable medium described herein may further include operations, features, means, or instructions for transmitting a second transport block in a second TTI of the set of consecutive TTIs that occurs after the first control channel occasion based on the feedback.

Some examples of the method, apparatuses, and non-transitory computer-readable medium described herein may further include operations, features, means, or instructions for receiving, within a control channel of a TTI occurring after the set of consecutive TTIs, transport block level feedback for at least one transport block transmitted within the set of consecutive TTIs.

In some examples of the method, apparatuses, and non-transitory computer-readable medium described herein, the feedback includes code block group-level feedback or code block-level feedback for the transport block.

Some examples of the method, apparatuses, and non-transitory computer-readable medium described herein may further include operations, features, means, or instructions for transmitting a different redundancy version of the transport block in at least two TTIs of the set of consecutive TTIs.

A method of wireless communication by a base station is described. The method may include transmitting, to a UE, an indicator of a feedback window that is offset relative to a beginning TTI of a set of consecutive TTIs, the feedback window including a set of control channel occasions interspersed within a duration of the set of consecutive TTIs, receiving a transport block within a first TTI of the set of consecutive TTIs, and transmitting, within a first control channel occasion of the set of control channel occasions, feedback indicating whether the transport block was successfully received.

An apparatus for wireless communication by a base station is described. The apparatus may include a processor, memory in electronic communication with the processor, and instructions stored in the memory. The instructions may be executable by the processor to cause the apparatus to transmit, to a UE, an indicator of a feedback window that is offset relative to a beginning TTI of a set of consecutive TTIs, the feedback window including a set of control channel occasions interspersed within a duration of the set of consecutive TTIs, receive a transport block within a first TTI of the set of consecutive TTIs, and transmit, within a first control channel occasion of the set of control channel occasions, feedback indicating whether the transport block was successfully received.

Another apparatus for wireless communication by a base station is described. The apparatus may include means for transmitting, to a UE, an indicator of a feedback window that is offset relative to a beginning TTI of a set of consecutive TTIs, the feedback window including a set of control channel occasions interspersed within a duration of the set of consecutive TTIs, receiving a transport block within a first TTI of the set of consecutive TTIs, and transmitting, within a first control channel occasion of the set of control channel occasions, feedback indicating whether the transport block was successfully received.

A non-transitory computer-readable medium storing code for wireless communication by a base station is described. The code may include instructions executable by a processor to transmit, to a UE, an indicator of a feedback window that is offset relative to a beginning TTI of a set of consecutive TTIs, the feedback window including a set of control channel occasions interspersed within a duration of the set of consecutive TTIs, receive a transport block within a first TTI of the set of consecutive TTIs, and transmit, within a first control channel occasion of the set of control channel occasions, feedback indicating whether the transport block was successfully received.

In some examples of the method, apparatuses, and non-transitory computer-readable medium described herein, transmitting the feedback further may include operations, features, means, or instructions for transmitting a grant that includes the feedback, where the grant indicates to terminate transmission of the transport block in at least one TTI of the set of consecutive TTIs that occurs after the first control channel occasion.

In some examples of the method, apparatuses, and non-transitory computer-readable medium described herein, the feedback indicates whether a code block or code block group of the transport block was successfully received.

Some examples of the method, apparatuses, and non-transitory computer-readable medium described herein may further include operations, features, means, or instructions for attempting to decode the transport block in each TTI of the set of TTIs that occurs prior to the first control channel occasion.

Some examples of the method, apparatuses, and non-transitory computer-readable medium described herein may further include operations, features, means, or instructions for transmitting a grant indicating the beginning TTI of the set of consecutive TTIs and allocation of resources within each TTI of the set of consecutive TTIs.

Some examples of the method, apparatuses, and non-transitory computer-readable medium described herein may further include operations, features, means, or instructions for receiving a capability indicator, where a time period between transmission of the grant and the beginning TTI may be based on the capability indicator.

Some examples of the method, apparatuses, and non-transitory computer-readable medium described herein may further include operations, features, means, or instructions for receiving a second transport block in a second TTI of the set of consecutive TTIs that occurs after the first TTI.

Some examples of the method, apparatuses, and non-transitory computer-readable medium described herein may further include operations, features, means, or instructions for transmitting, within a control channel of a TTI occurring after the set of consecutive TTIs, transport block level feedback for at least one transport block transmitted within the set of consecutive TTIs.

In some examples of the method, apparatuses, and non-transitory computer-readable medium described herein, the feedback includes code block group-level feedback or code block-level feedback for the transport block.

Some examples of the method, apparatuses, and non-transitory computer-readable medium described herein may further include operations, features, means, or instructions for monitoring for a different redundancy version of the transport block in at least two TTIs of the set of consecutive TTIs.

A method of wireless communication by a base station is described. The method may include transmitting, to a UE, an indicator of a feedback window that is offset relative to a beginning TTI of a set of consecutive TTIs, the feedback window including a set of control channel occasions interspersed within a duration of the set of consecutive TTIs, transmitting a transport block within a first TTI of the set of consecutive TTIs, and receiving, within a first control channel occasion of the set of control channel occasions, feedback to indicate whether the transport block was successfully received.

An apparatus for wireless communication by a base station is described. The apparatus may include a processor, memory in electronic communication with the processor, and instructions stored in the memory. The instructions may be executable by the processor to cause the apparatus to transmit, to a UE, an indicator of a feedback window that is offset relative to a beginning TTI of a set of consecutive TTIs, the feedback window including a set of control channel occasions interspersed within a duration of the set of consecutive TTIs, transmit a transport block within a first TTI of the set of consecutive TTIs, and receive, within a first control channel occasion of the set of control channel occasions, feedback to indicate whether the transport block was successfully received.

Another apparatus for wireless communication by a base station is described. The apparatus may include means for transmitting, to a UE, an indicator of a feedback window that is offset relative to a beginning TTI of a set of consecutive TTIs, the feedback window including a set of control channel occasions interspersed within a duration of the set of consecutive TTIs, transmitting a transport block within a first TTI of the set of consecutive TTIs, and receiving, within a first control channel occasion of the set of control channel occasions, feedback to indicate whether the transport block was successfully received.

A non-transitory computer-readable medium storing code for wireless communication by a base station is described. The code may include instructions executable by a processor to transmit, to a UE, an indicator of a feedback window that is offset relative to a beginning TTI of a set of consecutive TTIs, the feedback window including a set of control channel occasions interspersed within a duration of the set of consecutive TTIs, transmit a transport block within a first TTI of the set of consecutive TTIs, and receive, within a first control channel occasion of the set of control channel occasions, feedback to indicate whether the transport block was successfully received.

Some examples of the method, apparatuses, and non-transitory computer-readable medium described herein may further include operations, features, means, or instructions for transmitting a second indicator that indicates the duration of the set of consecutive TTIs, where the set of consecutive TTIs may be a set of aggregated TTIs.

In some examples of the method, apparatuses, and non-transitory computer-readable medium described herein, the feedback includes an acknowledgment to indicate successful receipt of the transport block.

Some examples of the method, apparatuses, and non-transitory computer-readable medium described herein may further include operations, features, means, or instructions for transmitting, to the UE, a grant indicating reallocation of at least one TTI of the set of consecutive TTIs that occurs after the first control channel occasion.

In some examples of the method, apparatuses, and non-transitory computer-readable medium described herein, the feedback includes a negative acknowledgment to indicate unsuccessful receipt of the transport block.

Some examples of the method, apparatuses, and non-transitory computer-readable medium described herein may further include operations, features, means, or instructions for receiving delta channel state information within the first control channel occasion.

Some examples of the method, apparatuses, and non-transitory computer-readable medium described herein may further include operations, features, means, or instructions for receiving, within a second control channel occasion of the set of control channel occasions that occurs prior to the first control channel occasion, a negative acknowledgment to indicate unsuccessful receipt of the transport block in a second TTI that occurs prior to the first TTI.

Some examples of the method, apparatuses, and non-transitory computer-readable medium described herein may further include operations, features, means, or instructions for receiving a grant indicating the beginning TTI of the set of consecutive TTIs and allocation of resources within each TTI of the set of consecutive TTIs.

Some examples of the method, apparatuses, and non-transitory computer-readable medium described herein may further include operations, features, means, or instructions for receiving a different redundancy version of the transport block in a subset of TTIs of the set of consecutive TTIs.

Some examples of the method, apparatuses, and non-transitory computer-readable medium described herein may further include operations, features, means, or instructions for transmitting a second transport block in a second TTI of the set of consecutive TTIs that occurs after the first TTI based on the feedback including an acknowledgement.

Some examples of the method, apparatuses, and non-transitory computer-readable medium described herein may further include operations, features, means, or instructions for receiving, within a second control channel occasion of the set of control channel occasions, a second feedback to indicate whether the second transport block was successfully received.

Some examples of the method, apparatuses, and non-transitory computer-readable medium described herein may further include operations, features, means, or instructions for receiving, within a control channel of a TTI occurring after the set of consecutive TTIs, channel state information feedback and second feedback.

Some examples of the method, apparatuses, and non-transitory computer-readable medium described herein may further include operations, features, means, or instructions for transmitting a second indicator that associates a respective redundancy version of a set of redundancy versions of the transport block with a respective TTI of the set of TTIs.

Some examples of the method, apparatuses, and non-transitory computer-readable medium described herein may further include operations, features, means, or instructions for transmitting a different redundancy version of the transport block in at least two TTIs of the set of consecutive TTIs.

DETAILED DESCRIPTION

Figure 1:
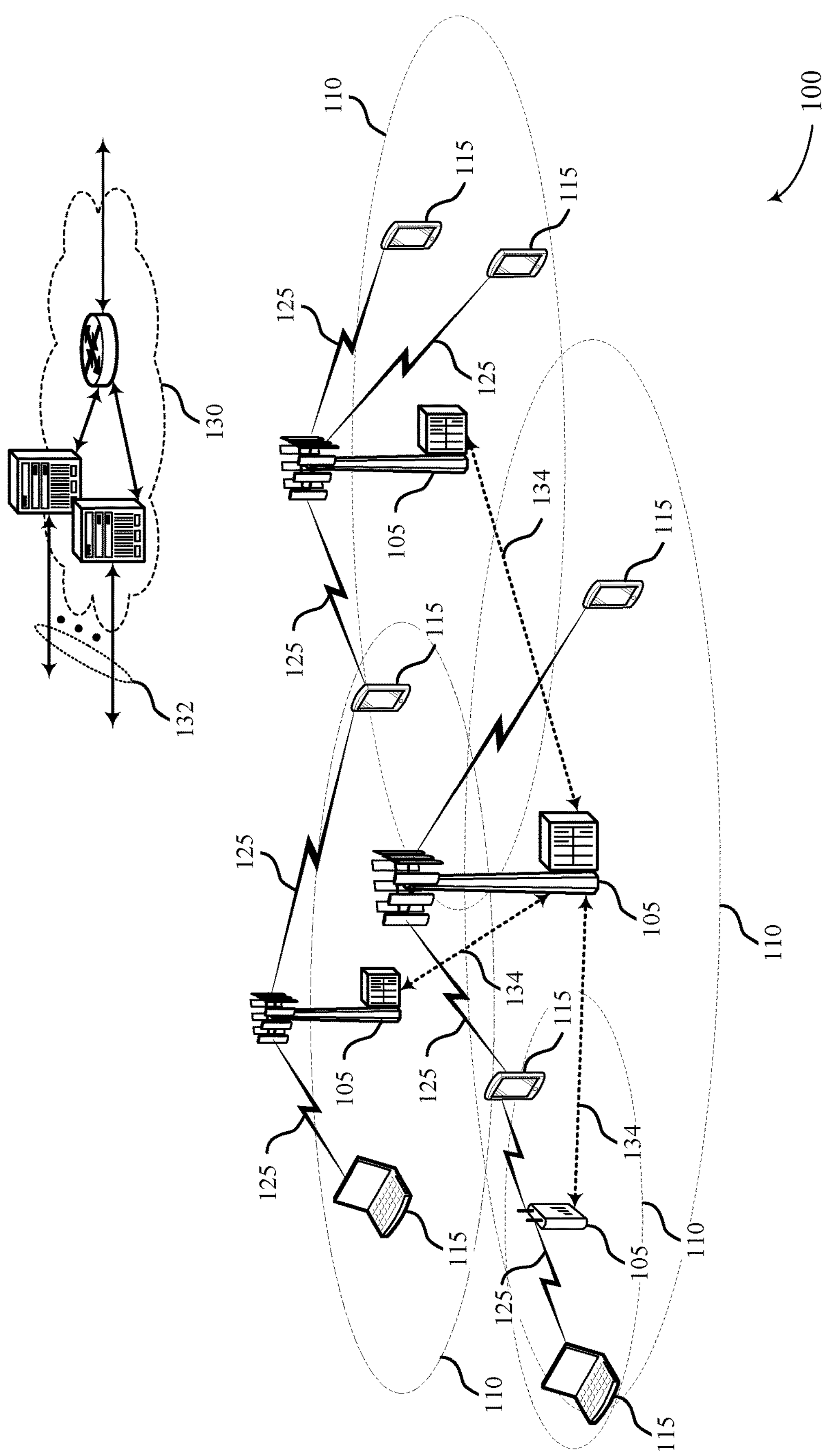
FIG. 1 illustrates an example of a system for wireless communications in accordance with aspects of the present disclosure.

The described techniques relate to improved methods, systems, devices, or apparatuses that support early feedback within a duration of a multi-transmission time interval (multi-TTI) grant or within a duration of a set of aggregated slots. Generally, the described techniques enable a user equipment (UE) or a base station to provide early feedback information (e.g., acknowledgement/negative acknowledgement (ACK/NACK) information) within a feedback window that includes a set of control channel occasions that are interspersed within a duration of a set of consecutive TTIs. The set of consecutive TTIs may be a set of aggregated slots or may correspond to a multi-TTI grant. The feedback window may be offset relative to a beginning TTI of the set of consecutive TTIs. The UE or base station may use at least one of the control channel occasions to provide earlier feedback on whether a transport block is successfully received within one of the TTIs, rather than waiting to provide feedback until after the last TTI of the set of consecutive TTIs.

For communication based on multi-TTI grants and slot aggregation, feedback may occur following the last TTI (for multi-TTI grants) or following the last slot (for aggregated slots). By applying the techniques described herein that enable earlier feedback, a UE or base station may be able to reallocate later TTIs within the set of consecutive TTIs for other transmissions when the feedback indicates successful receipt of a transport block in one of the earlier TTIs. In addition, such early feedback may reduce retransmission latency by permitting earlier retransmission of TBs that are not successfully received within the set of consecutive TTIs.

A TTI may be a duration of time resources that may be allocated by a base station, and may include one or more symbol periods, mini-slots, slots, subframes, frames, or the like. Consecutive TTIs may refer to TTIs that are immediately consecutive in time to one another and are not separated by intervening communication resources or transmissions. In some cases, a duration or a number of consecutive TTIs may be determined by a transmitter and indicated to a receiver prior to transmission or reception on transmission resources within any TTI of the consecutive TTIs.

In slot aggregation, the same transport block (TB) may be repeatedly transmitted (or received) in each slot of multiple consecutive slots, and in some cases a different redundancy version of the same TB may be communicated within up to each slot of the consecutive slots. Such retransmissions using slot aggregation may increase the likelihood that a receiver (e.g., a UE, a base station) will successfully decode information contained in the TB in at least one of the slots. The receiver may be considered to have successfully decoded the information if, for example, the bits decoded from a particular slot passes a cyclic redundancy check (CRC). A receiver may be configured to provide feedback information—such as ACK/NACK information, channel state information (CSI), or other types of feedback information—to the transmitter after the receiver has received all of the TBs in all of the aggregated slots and attempted to decode the information in the TB. In some cases, the receiver may be configured to provide such feedback using an uplink control channel, such as a physical uplink control channel (PUCCH).

In some cases, the number of consecutive slots to be aggregated (which may be referred to as the slot aggregation duration) may be determined by a transmitter based on channel conditions or other factors. The transmitter may transmit an indication of the slot aggregation duration to the receiver using RRC signaling, and hence the slot aggregation duration may be semi-static. In some cases, the transmitter may conservatively configure the slot aggregation duration to increase the likelihood that the receiver will be able to successfully decode TBs and to allow for changing channel conditions or other factors.

In some cases, however, a receiver may be able to successfully decode a TB received in an earlier slot of the set of aggregated slots. The transmitter may continue, however, to transmit the same TB, or at least a redundancy version of the same TB, in the remaining slots of the set of aggregated slots, thereby inefficiently using the transmission resources of the remaining slots. In this case, it may be advantageous for a receiver to provide early feedback information (e.g., an ACK indication) to the transmitter before the last slot of the aggregated slots. Such early feedback may enable the transmitter to terminate transmission of the TB on the remaining slots, thereby freeing time-frequency resources for other transmissions.

Early feedback may also be useful in the case of multi-TTI grants. A multi-TTI grant provides a grant of resources to a receiver in multiple consecutive TTIs for uplink or downlink communication. In some cases, a transmitter (e.g., a base station) may indicate the number of TTIs in the grant itself (e.g., in downlink control information (DCI)), rather than via RRC signaling. In some cases, the number of TTIs may be indicated using a combination of RRC and DCI signaling, where RRC signaling may be used to indicate the number of TTIs to be potentially included in a multi-TTI grant and the multi-TTI grant can indicate the specific TTIs that are scheduled in the multi-TTI grant.

In a multi-TTI grant, each TTI may be used to convey a different TB rather than repeating the same TB (or a different redundancy version of the same TB) as in slot aggregation. Early feedback may provide advantages in the context of multi-TTI grants. For example, if a receiver transmits early feedback (e.g., ACK/NACK feedback) in the middle of the consecutive TTIs indicating that a TB in one of the consecutive TTIs was not successfully received, the transmitter may be able to retransmit the TB within a later TTI of the set of consecutive TTIs, rather than waiting until the transmitter receives feedback after the end of the consecutive TTIs. Even if the transmitter is not able to retransmit the TTI with the consecutive set of TTIs, it may be able to retransmit the TB in a TTI that occurs after the end of the set of consecutive TTIs sooner because the transmitter is able to process the feedback earlier. In either case, the latency associated with the retransmission may be reduced.

Aspects of the disclosure are initially described in the context of a wireless communications system. The wireless communications system may provide for a feedback window for providing early feedback for transmissions in a set of consecutive TTIs. Aspects of the disclosure are further illustrated by and described with reference to apparatus diagrams, system diagrams, and flowcharts that relate to providing early feedback with slot aggregation and multi-TTI grants.

FIG. 1 illustrates an example of a wireless communications system 100 in accordance with aspects of the present disclosure. The wireless communications system 100 includes base stations 105, UEs 115, and a core network 130. In some examples, the wireless communications system 100 may be an LTE network, an LTE-A network, or an NR network. In some cases, wireless communications system 100 may support enhanced broadband communications, ultra-reliable (i.e., mission critical) communications, low latency communications, and communications with low-cost and low-complexity devices.

In accordance with the examples described herein, a base station 105 may transmit, to a UE 115, a grant of resources of a shared channel over a set of multiple consecutive TTIs, which may be a set of aggregated slots or may correspond to a multi-TTI grant. The grant of resources may be used for uplink transmission, downlink transmission, or both, within the resources of the shared channel over the set of consecutive TTIs. The UE 115 may monitor a control channel for the grant of resources transmitted by base station 105.

In some examples, the UE 115 may receive an indicator of a feedback window that is offset relative to a beginning TTI of the set of TTIs. The feedback window may include multiple control channel occasions that are interspersed within a duration of the set of consecutive TTIs.

In some examples, the UE 115 may receive a transport block within a first TTI of the set of consecutive TTIs, and transmit feedback to the base station 105 to indicate whether the TB was successfully received. The UE 115 may transmit the feedback within at least one of the multiple control channel occasions.

In some examples, the UE 115 may transmit, to the base station 105, a transport block within a first TTI of the set of consecutive TTIs. The UE 115 may receive feedback information from the base station 105 indicating whether the transport block was successfully received. The UE 115 may receive the feedback information within at least one of the multiple control channel occasions.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105 or downlink transmissions from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of Things (IoT) device, an Internet of Everything (IoE) device, a machine type communication (MTC) device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving “deep sleep” mode when not engaging in active communications. In some cases, MTC or IoT devices may be designed to support mission critical functions and wireless communications system may be configured to provide ultra-reliable communications for these functions.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as evolved NodeBs (eNBs) 105.

A base station 105 may be connected by an S1 interface to the core network 130. The core network may be an evolved packet core (EPC), which may include at least one mobility management entity (MME), at least one serving gateway (S-GW), and at least one Packet Data Network (PDN) gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service.

The core network 130 may provide user authentication, access authorization, tracking, Internet Protocol (IP) connectivity, and other access, routing, or mobility functions. At least some of the network devices, such as base station 105 may include subcomponents such as an access network entity, which may be an example of an access node controller (ANC). Each access network entity may communicate with a number of UEs 115 through a number of other access network transmission entities, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate in an ultra-high frequency (UHF) frequency region using frequency bands from 700 MHz to 2600 MHz (2.6 GHz), although some networks (e.g., a wireless local area network (WLAN)) may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Thus, wireless communications system 100 may support millimeter wave (mmW) communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 105) to shape and/or steer an overall antenna beam in the direction of a target receiver (e.g., a UE 115). This may be achieved by combining elements in an antenna array in such a way that transmitted signals at particular angles experience constructive interference while others experience destructive interference.

Multiple-input multiple-output (MIMO) wireless systems use a transmission scheme between a transmitter (e.g., a base station 105) and a receiver (e.g., a UE 115), where both transmitter and receiver are equipped with multiple antennas. Some portions of wireless communications system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of an RRC connection between a UE 115 and a network device, base station 105, or core network 130 supporting radio bearers for user plane data. At the Physical (PHY) layer, transport channels may be mapped to physical channels.

Time intervals in LTE or NR may be expressed in multiples of a basic time unit (which may be a sampling period of $T_s$=1/30,720,000 seconds). Time resources may be organized according to radio frames of length of 10 ms ($T_f$=307200 $T_s$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases, the subframe may be the smallest scheduling unit, also known as a transmission time interval (TTI). In other cases, a TTI may be shorter than a subframe or may be dynamically selected (e.g., in short TTI bursts or in selected component carriers using short TTIs, for example, slots or mini-slots). [this description seems unclear about what the relationship/distinction between slots and TTIs is—sounds like a slot is a short TTI?]

A resource element may consist of one symbol period and one subcarrier (e.g., a 15 KHz frequency range). A resource block may contain 12 consecutive subcarriers in the frequency domain and, for a normal cyclic prefix in each orthogonal frequency division multiplexing (OFDM) symbol, 7 consecutive OFDM symbols in the time domain (1 slot), or 84 resource elements. The number of bits carried by each resource element may depend on the modulation scheme (the configuration of symbols that may be selected during each symbol period). Thus, the more resource blocks that a UE receives and the higher the modulation scheme, the higher the data rate may be.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms “carrier,” “component carrier,” “cell,” and “channel” may be used interchangeably herein. A UE 115 may be configured with multiple downlink CCs and one or more uplink CCs for carrier aggregation. Carrier aggregation may be used with both frequency division duplexing (FDD) and time division duplexing (TDD) component carriers.

In some cases, wireless communications system 100 may utilize enhanced component carriers (eCCs). An eCC may be characterized by one or more features including: wider bandwidth, shorter symbol duration, shorter TTIs, and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds). A TTI in eCC may consist of one or multiple symbols. In some cases, the TTI duration (that is, the number of symbols in a TTI) may be variable.

A shared radio frequency spectrum band may be utilized in an NR shared spectrum system. For example, an NR shared spectrum may utilize any combination of licensed, shared, and unlicensed spectrums, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some cases, wireless system 100 may utilize both licensed and unlicensed radio frequency spectrum bands. For example, wireless system 100 may employ LTE License Assisted Access (LTE-LAA) or LTE Unlicensed (LTE U) radio access technology or NR technology in an unlicensed band such as the 5 GHz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on FDD, TDD, or a combination of both.

LTE and NR provide for multi-TTI grants in which a base station grants resources to a UE over multiple TTIs. NR systems also provide for slot aggregation in which a base station may grant a UE resources in one or more slots. Conventional LTE and NR systems lack techniques for providing early feedback within a multi-TTI grant or within a set of aggregated slots. The described techniques may enable a UE to provide early feedback to a base station before the end of a multi-TTI grant or a set of aggregated slots.

Figure 2:
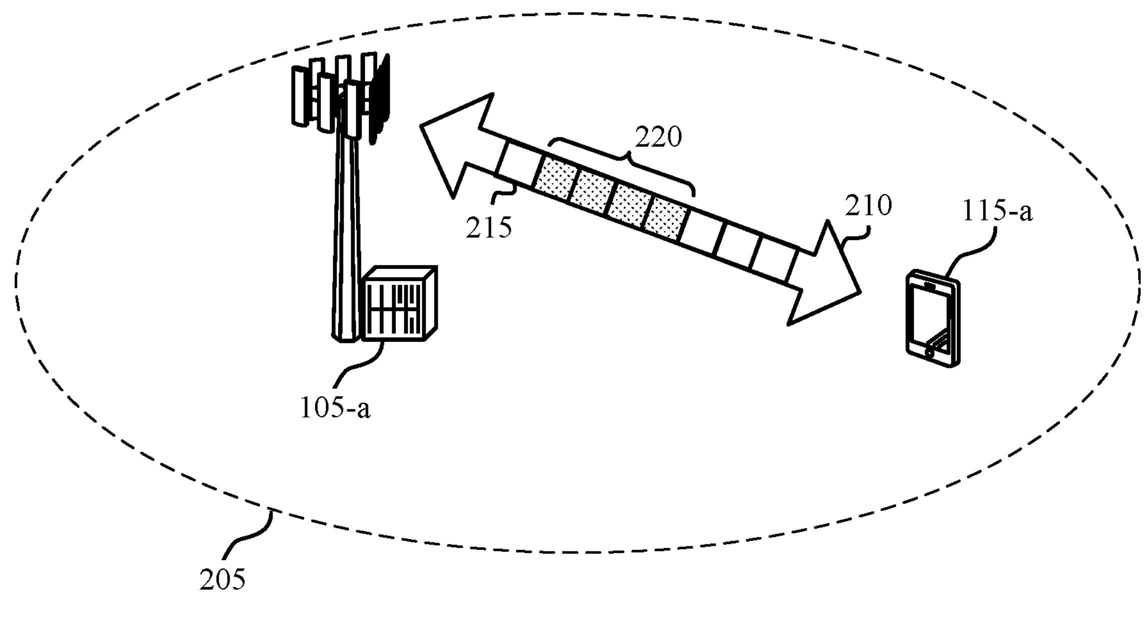
FIG. 2 illustrates an example diagram of a wireless communications system in accordance with aspects of the present disclosure.

FIG. 2 illustrates an example diagram 200 of a wireless communications system in accordance with aspects of the present disclosure. In some examples, wireless communications system 200 may implement aspects of wireless communication system 100. Wireless communications system 200 may include a base station 105-*a* and a UE 115-*a*, which may be examples of the corresponding devices described with reference to FIG. 1.

In some examples, base station 105-*a* may communicate with one or more UEs 115 within geographic coverage area 205. For example, base station 105-*a* may be in communication with UE 115-*a* via bidirectional communication link 210. In some examples, time and frequency resources may include a bandwidth that is divided into transmission time intervals (TTIs) 215 in which the base station 105-*a* and UE 115-*a* may communicate. The TTIs 215-*a* may represent time durations that may be of a fixed length within the bandwidth. In some examples, a base station 105-*a* may provide a multi-TTI grant of multiple consecutive TTIs 220 to a UE 115-*a*, and the base station 105-*a* and the UE 115-*a* may use the resources associated with the multiple consecutive TTIs 220 for communication of uplink and/or downlink data.

In some examples, time and frequency resources may include a bandwidth that is divided into TTIs in which the base station 105-*a* and UE 115-*a* may communicate. A TTI may be a duration of time resources that may be allocated by a base station, and may include one or more symbol periods, mini-slots, slots, subframes, frames, or the like.

In some cases, a base station 105-*a* may allocate a set of aggregated slots for communication with a UE 115-*a*. In some examples, a set of aggregated slots may be an example of consecutive TTIs; thus, consecutive TTIs 220 as depicted in FIG. 2 may also depict a set of aggregated slots. The base station 105-*a* may signal the aggregated slot duration (e.g., the number of slots in the set of aggregated slots) to the UE using, for example, control signaling such as RRC signaling.

Figure 3:
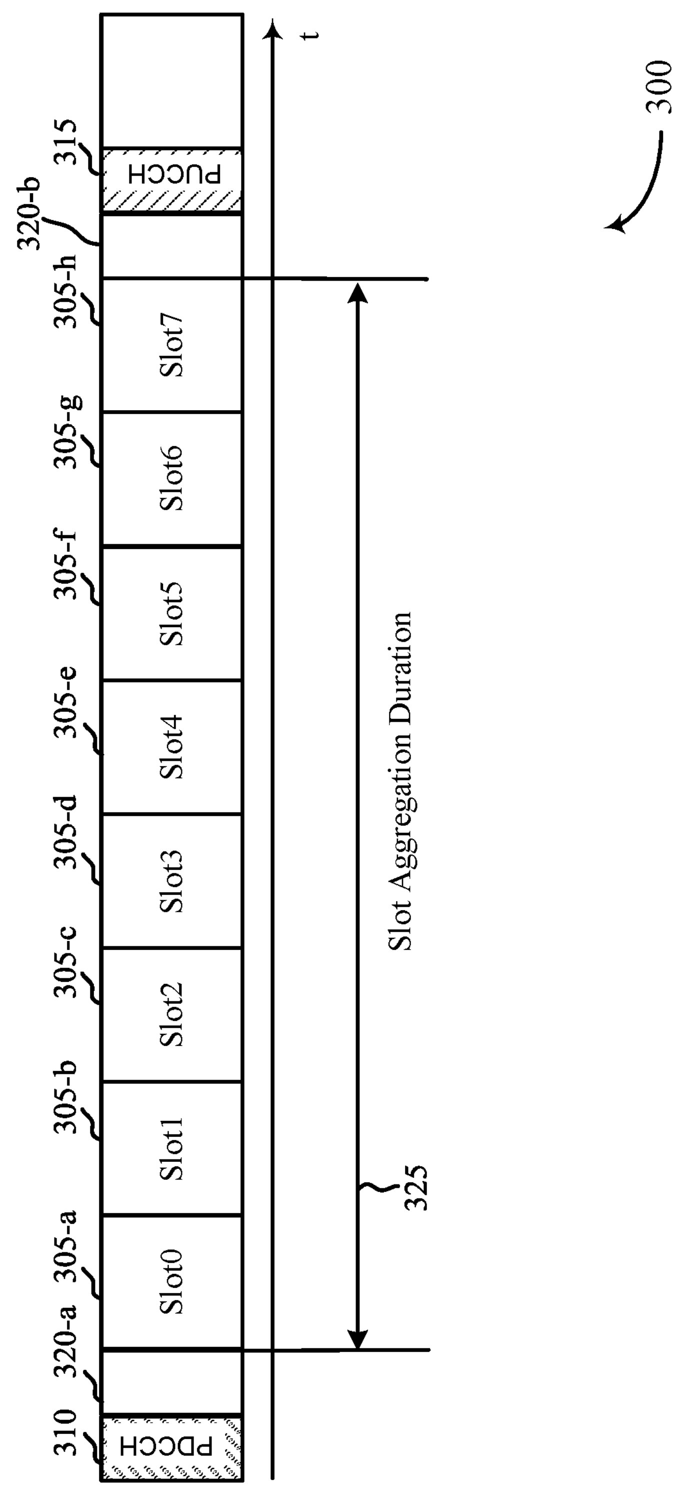
FIG. 3 illustrates an example of a communication timeline in accordance with aspects of the present disclosure.

FIG. 3 illustrates an example communication timeline 300 depicting a timeline for receiving (e.g., by a UE 115) transport blocks in a set of aggregated slots 305 and providing early feedback (e.g., to a base station 105). In some examples, communication timeline 300 may implement aspects of wireless communication system 100. In some examples, communication timeline 300 may depict communications between a base station (e.g., base station 105) and a UE (e.g., UE 115) as described with reference to FIGS. 1-2.

The UE 115 may receive the transport blocks from a base station 105 during a downlink transmission, such as a physical downlink shared channel (PDSCH) transmission, for example. The set of aggregated slots 305 may be preceded by a downlink control channel occasion 310 and followed by an uplink control channel occasion 315. The set of aggregated slots 305 may be consecutive slots (e.g., consecutive TTIs) used for communication of data between a UE 115 and a base station 105. While FIG. 3 depicts a set of aggregated slots 305 having eight consecutive slots, other examples of sets of aggregated slots may include more or fewer slots.

A base station 105 may transmit data or other information within the slots using TBs. In some cases, a base station 105 may transmit the same TB (or a redundancy version of the same TB) in each slot of the aggregated slots 305.

In some examples, the downlink control channel occasion 310 may be a period of time during which a UE monitors a downlink control channel (e.g., a physical downlink control channel (PDCCH)) for downlink control information (DCI) related to a downlink transmission (e.g., a PDSCH transmission), which may include a grant of resources for transmission. In some examples, the downlink control channel occasion 310 may be of a shorter duration or the same duration as a slot in the aggregated set of slots.

In some examples, the uplink control channel occasion 315 may be a period of time during which a UE 115 may transmit feedback information or other control information to a base station 105 on an uplink control channel (e.g., a physical uplink control channel (PUCCH)). Such feedback or control information may be related to data received from the base station during a PDSCH transmission and may include, for example, HARQ feedback such as ACK/NACK feedback, CSI feedback, uplink control information (UCI), or other forms of feedback or control information. In some examples, the uplink control channel occasion 315 may be of a shorter duration or the same duration as a slot in the aggregated set of slots. In some examples, the uplink control channel occasion 315 may occur in a slot that occurs after the set of aggregated slots 305.

In some examples, the downlink control channel occasion 310 may be separated from the first slot 305-*a* by a first gap 320-*a*. In some examples, the uplink control channel occasion 315 may be separated from the last slot 305-*h* by a second gap 320-*b*. In some cases, a gap 320-*a* may be a period of time that is based on the amount of time required for a UE to process a grant and begin transmitting or receiving data.

In some examples, a base station 105 may determine a slot aggregation duration 325 for transmitting data to a UE 115. The slot aggregation duration 325 may be a duration of time consumed by the aggregated slots 305. A base station 105 may transmit an indication of the slot aggregation duration 325 to the UE 115 via, for example, RRC signaling. Thus, the slot aggregation duration 325 (e.g., the number of slots in the set of aggregated slots) may be configured semi-statically.

In some cases, in slot aggregation, a base station 105 may transmit the same TB multiple times to a UE 115 to improve a link budget, for example. Thus, in some cases, a TB may be transmitted in each slot 305 of the set of aggregated slots, and, in some cases, a different redundancy version of the same TB may be transmitted in up to each slot of the set of consecutive slots. In some cases, the base station 105 may inform the UE 115 of which redundancy version is being sent in which slot of the set of consecutive slots, (e.g., a include a redundancy version identification (RVID)), or a transmission of a TB in a particular slot may include information identifying which redundancy version of the TB is being sent in that slot. In some examples, the base station 105 may configure the slot duration along with the corresponding RVID on each slot. In some cases, during slot aggregation, one slot may be punctured if the uplink or downlink configuration indicates that the slot is not used for the corresponding downlink or uplink transmission. A UE 115 may monitor resources during the aggregated slots 305 to receive TBs in each of the aggregated slots 305. The UE 115 may then attempt to decode each TB as it is received.

In some cases, a UE 115 may transmit, to the base station 105, feedback information during the uplink control channel occasion 315, which may occur after all of the slots in the set of aggregated slots 305. Such feedback information may include, for example, ACK/NACK feedback indicating whether the TB was successfully decoded, CSI feedback indicating the state of the communication channel, and/or other types of feedback. The UE 115 may transmit the feedback information to the base station 105 via an uplink control channel (e.g., using PUCCH resources).

In the example of FIG. 3, the slot aggregation duration 325 is a duration of eight slots (Slot0-Slot7), which may correspond to eight repeated TBs. If the UE is able to successfully decode the TB by the last (eighth) slot of the set of aggregated slots 305, the UE 115 may transmit, during the uplink control channel occasion 315, feedback information to the base station 105 that includes ACK feedback indicating that the TB was successfully received. If the UE is not able to successfully decode the TB by the last slot, the UE 115 may transmit feedback information to the base station 105 that includes NACK feedback indicating that the TB was unsuccessfully received.

In some cases, however, the UE 115 may be able to decode the TB using fewer slots than the set of aggregated slots 305. For example, a UE may be able to decode the TB after two slots 305-*a*, 305-*b* (e.g., after receiving two TBs). In this case, the UE may not need to receive the remaining TBs for decoding. However, if the UE waits to transmit ACK feedback until the uplink control channel occasion 315, which occurs after all of the aggregated slots, a base station 105 may not receive the ACK until the base station has already transmitted all of the TBs using the full set of aggregated slots 305. These unneeded transmissions may introduce unnecessary system overhead. Thus, in some cases, it may be advantageous for the UE 115 to provide earlier feedback to enable early termination of transmissions that use slot aggregation.

Figure 4:
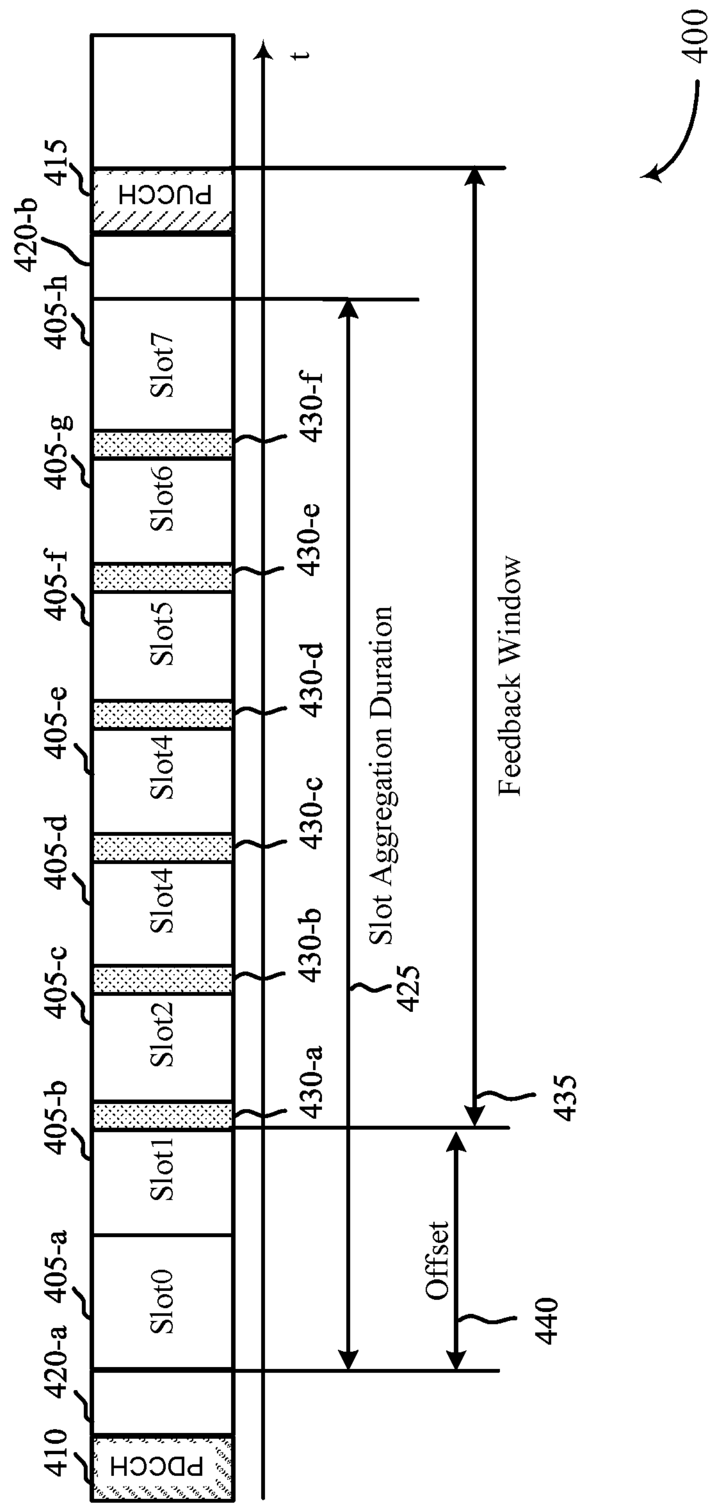
FIG. 4 illustrates an example of a communication timeline in accordance with aspects of the present disclosure.

FIG. 4 illustrates an example communication timeline 400 depicting a timeline for receiving (e.g., by a UE 115) transport blocks in a set of aggregated slots 405 and providing early feedback (e.g., to a base station 105) in the middle of the aggregated slots 405. In some examples, communication timeline 400 may depict communications between a base station (e.g., base station 105) and a UE (e.g., UE 115) as described with reference to FIGS. 1-2.

The UE 115 may receive the transport blocks from a base station 105 during a downlink transmission, such as a PDSCH transmission, for example. While the following discussion focuses on a base station transmitting TBs to a UE, similar techniques may be applied to a UE transmitting TBs to a base station.

The set of aggregated slots 405 may be preceded by a downlink control channel occasion 410 and followed by an uplink control channel occasion 415. The set of aggregated slots 405 may be consecutive slots used for communication of data (e.g., TBs) between a UE and a base station, such as UE 115 or base station 105. The slot aggregation duration 425 may be a duration of time consumed by the aggregated slots 405. In some cases, a base station 105 may transmit the same TB (or a redundancy version of the same TB) in each of the aggregated slots 405.

Communication timeline 400 further includes control channel occasions 430 interspersed within the duration of the aggregated slots 405. In some examples, control channel occasions 430 may provide opportunities for the UE to provide feedback information in the middle of the aggregated slots 405; e.g., before the uplink control channel occasion 415. The UE may transmit feedback information via a control channel (e.g., using PUCCH resources) during one or more of the control channel occasions 430. A control channel occasion 430 may be one or more symbol periods within a particular slot 405 in which the UE 115 may transmit feedback information.

Communication timeline 400 includes feedback window 435, which may be a duration of time that begins at the start of the first control channel occasion 430-*a* and finishes at the end of the uplink control channel occasion 415. Thus, feedback window 435 may be a window of time during which a UE may have multiple opportunities to transmit feedback information during one or more control channel occasions 430 or during the uplink control channel occasion 415. In some examples, feedback window 435 may be offset in time relative to the beginning slot of the set of aggregated slots by offset 440; that is, feedback window 435 may not begin at the same time as the beginning slot 405-*a*.

In some examples, a UE 115 may receive (e.g., from a base station 105) an indication of the start of the feedback window 435 (e.g., an earliest control channel occasion) and/or a duration of the feedback window. The UE 115 may receive the indication of the start of the feedback window and/or the duration of the feedback window via RRC signaling, for example, or as part of a grant received during the downlink control channel occasion 410 using PDCCH resources.

In some cases, reduced feedback information (e.g., light feedback) may be transmitted during a control channel occasion 430 that is a subset of the feedback information that may be transmitted during an uplink control channel occasion 415. Such reduced feedback information may consume fewer resources than regular feedback information. For example, reduced feedback information may include only ACK/NACK feedback to indicate whether a TB was successfully received, in which case the reduced feedback information may consume only one bit (e.g., '0' to indicate a NACK or '1' to indicate an ACK, or vice versa). In some cases, reduced feedback information may additionally or alternatively include delta CSI information (e.g., indicating a change in the channel state information) and/or an indication of the number of additional TBs the UE needs in order to successfully decode the data in the TB. In this case, the reduced feedback information may consume one or more bits, or may potentially consume as many bits as regular feedback information.

In some examples, if a UE 115 is able to decode a TB before the last slot 405-*h* of the aggregated slots 405, the UE may transmit feedback information, such as an ACK, during one or more of the control channel occasions 415. A base station 105 may receive the early ACK feedback from the UE 115 (e.g., by monitoring an uplink control channel, such as PUCCH), and may terminate PDSCH transmission on the remaining slots that are configured for slot aggregation (e.g., the remaining slots in the set of aggregated slots).

In some examples, if a UE 115 is not able to decode the TB before a particular control channel occasion 430, the UE 115 may not transmit any feedback information during the particular control channel occasion 430 or may transmit a NACK indication during the particular control channel occasion 430. In some examples, if the base station 105 detects early ACK feedback from the UE, the base station may terminate PDSCH transmission on the remaining slots configured for slot aggregation.

In some examples, a UE 115 may transmit feedback information in a particular control channel occasion 430 corresponding to a particular slot 405 (or a prior slot), such as an ACK to indicate successful receipt of the TB in the particular slot or a NACK to indicate unsuccessful receipt of the TB in the particular slot.

In some examples, if the UE 115 transmits feedback information during a control channel occasion 415, the UE may not transmit any feedback information or may not transmit the same feedback information in subsequence control channel occasions 430. For example, if a UE 115 transmits an ACK in a first control channel occasion 430, the UE 115 may not transmit another ACK in any subsequent control channel occasion 430. In some examples, the UE 115 may not transmit any feedback information in any subsequent control channel occasions 430.

In some examples, if a UE 115 transmits an ACK within a control channel occasion 430 corresponding to a particular slot 405, the UE may discontinue monitoring some or all of the slots that occur after the particular slot in the set of aggregated slots 405.

In some examples, if a UE 115 transmits an ACK within a control channel occasion 430 corresponding to a particular slot 405, the UE may continue to monitor some or all of the slots that occur after the particular slot in the set of aggregated slots. In this case, the UE may receive a different redundancy version of the same TB in one or more subsequent slots, and may transmit feedback information during one or more subsequent control channel occasion(s). In some cases, the UE may monitor at least two slots of the set of aggregated slots for a different redundancy version of the TB. In some cases, the UE may receive a second indicator that associates a redundancy version with a particular slot of the set of aggregated slots. For example, a base station 105 may inform a UE 115 of which redundancy version of the same TB is being sent in which TTI of the set of consecutive TTIs.

In some examples, if the UE 115 fails to decode the TB before the end of the aggregated slots 405, the UE may transmit regular feedback information, such as a NACK or delta CSI, or discontinuous transmission (DTX) information on the PUCCH resource during the uplink control channel occasion 415.

In some examples, if the UE 115 is operating on a shared radio frequency spectrum band (e.g., an unlicensed spectrum), the UE 115 may perform a clear channel assessment on the shared radio frequency spectrum band prior to transmitting feedback during a control channel occasion 430. A clear channel assessment may be performed using a listen-before-talk (LBT) procedure, for example.

In some cases, it may be advantageous for a UE 115 to have multiple opportunities to provide feedback information in the middle of the aggregated slots 405 to allow for early transmission termination and better turn-around time (e.g., to enable a base station to terminate transmission of TBs before the end of the aggregated slots and initiate other communications). In addition, it may be advantageous for a UE to have multiple opportunities to send feedback information during communications in an unlicensed spectrum (e.g., to re-transmit feedback information in multiple control channel occasions) in case an initial transmission of feedback information is not successfully received by the base station due to receiver interference or a failure of the LBT procedure, for example. If a UE 115 is unable to transmit feedback during a particular control channel occasion because the LBT procedure determines that the channel is not available, the UE 115 may re-attempt to transmit the feedback during or more subsequent control channel occasions. Such feedback retransmission may help to increase the PUCCH reliability.

In some cases, each slot of the set of aggregated slots 405 is associated with a corresponding control channel occasion 430, such that the number of control channel occasions 430 is the same as the number of slots in the set of aggregated slots. In some cases, some slots in the set of aggregated slots 405 may not be associated with a corresponding control channel occasion 430. For example, the last slot 405-*h* of the set of aggregated slots 405 may not have a corresponding control channel occasion 430 since the base station may have already transmitted all of the TBs and therefore may not benefit from receiving feedback information corresponding to the last slot 405-*h*. For example, the first slot 405-*a* of the set of aggregated slots 405 may not have a corresponding control channel occasion 430 because the UE may require additional time to switch from receiving TBs to transmitting feedback, or because the UE may be unlikely to be able to decode the TB using only the TB conveyed in the first slot 405-*a*. Other slots in the set of aggregated slots 405 may not have corresponding control channel occasions 430.

In general, there may be a tradeoff between the number of control channel occasions 430 in which a UE 115 has an opportunity to provide feedback and the overhead associated with such opportunities.

In some cases, a base station may determine the start of the feedback window 435 (e.g., an earliest control channel occasion) based on a capability of the UE. Thus, a time period between the beginning TTI and the earliest control channel occasion may be based on a capability of the UE. A UE may transmit a capability indicator to the base station 105 that indicates one or more of the UE's capabilities via, for example, RRC signaling. Such capabilities may include, for example, the symbol period (e.g., the number of OFDM symbols) or time duration required for the UE to switch from receiving data to transmitting feedback. In some cases, a base station may transmit an indication of the start of the feedback window following K1 signaling in PDCCH, and based on a UE capability report on N1 and N1'. N1 is the number of OFDM symbols after the end of PDSCH reception to an earliest start of a corresponding ACK/NACK transmission on PUCCH resources by the UE 115, and N1' is the number of OFDM symbols after the end of PDSCH reception to an earliest start of a corresponding ACK/NACK transmission piggybacked on a physical uplink shared channel (PUSCH). Due to PUSCH transmission associated with N1', N1'>=N1. K1 is the number of slots after the end of PDSCH reception to an earliest start of a corresponding ACK/NACK transmission by the UE 115.

In some cases, if a UE 115 transmits an ACK in one of the control channel occasions 430, the UE may refrain from retransmitting the ACK or transmitting subsequent feedback during subsequent channel control occasions 430. In some cases, the UE may retransmit the ACK during one or more subsequent control channel occasions 430 and/or during the uplink control channel occasion 415.

In some cases, if a UE 115 transmits an ACK indication during one of the control channel occasions 430, the UE may refrain from transmitting feedback information during the uplink control channel occasion 415, or may transmit a reduced set of feedback during the uplink control channel occasion 415. For example, if the UE transmits an ACK during a control channel occasion 430, the UE may refrain from transmitting an ACK during the uplink control channel occasion 415, but may still transmit CSI information or other types of information during the uplink control channel occasion 415.

In some cases, if a UE 115 transmits feedback (e.g., an ACK) during one of the control channel occasions 430, the UE 115 may subsequently transmit regular feedback information during the uplink control channel occasion 415, which may include an ACK/NACK indication, CSI information, or other types of information. In some cases, the UE 115 may transmit feedback during the uplink control channel occasion 415 that consumes regular PUCCH overhead, depending on the presence of CSI information.

In some cases, a single multi-TTI grant (e.g., received via PDCCH) may indicate multiple transmissions (e.g., multiple PDSCH transmissions) over multiple TTIs. The above-described techniques for transmitting (e.g., by a UE) early feedback information during communications based on slot aggregation may be extended to the case of multi-TTI grants.

Figure 5:
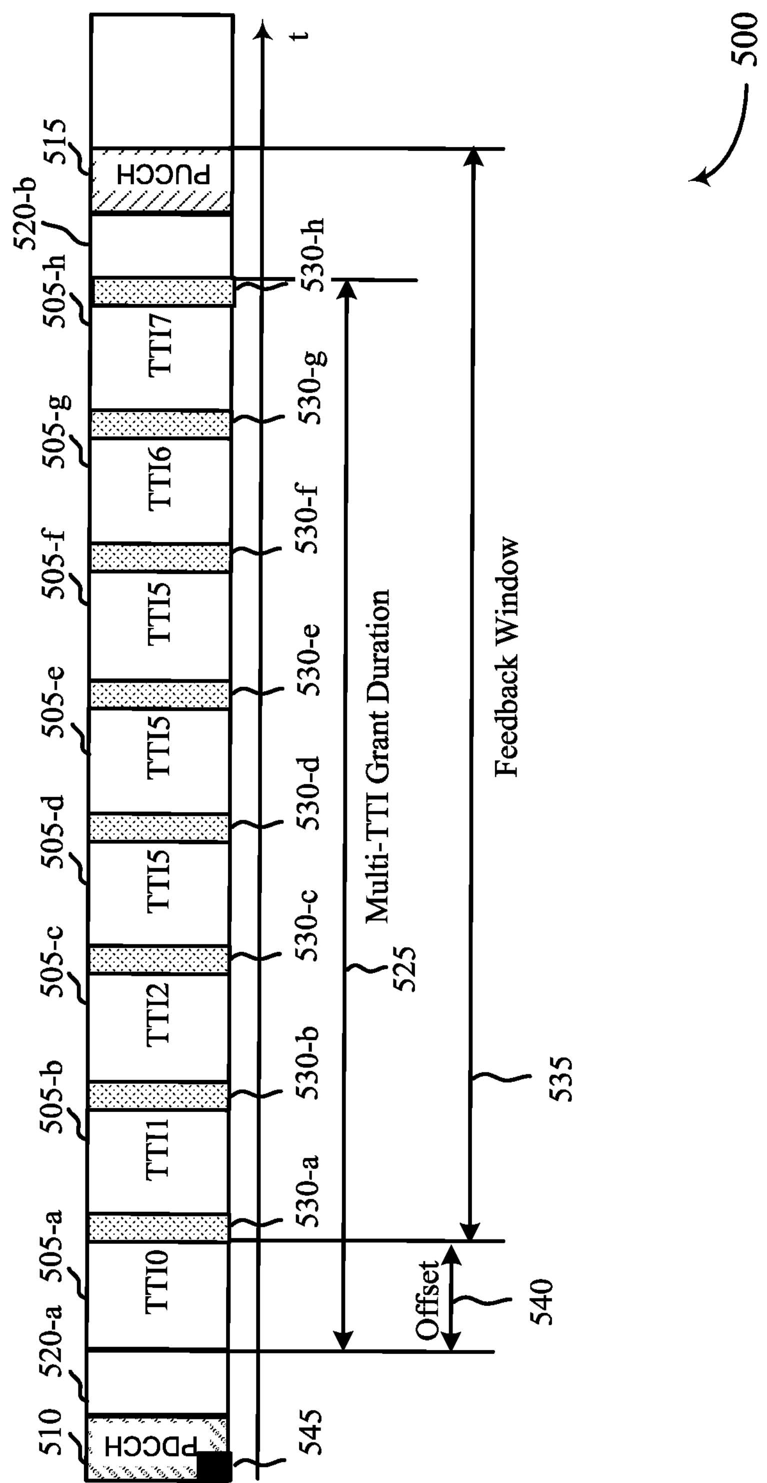
FIG. 5 illustrates an example of a communication timeline in accordance with aspects of the present disclosure.

FIG. 5 illustrates an example communication timeline 500 depicting a timeline for receiving (e.g., by a UE 115) consecutive TTIs 505 based on a multi-TTI grant and providing early feedback (e.g., to a base station 105). In some examples, communication timeline 500 may depict communications between a base station (e.g., base station 105) and a UE (e.g., UE 115) as described with reference to FIGS. 1-2.

The UE 115 may receive TBs in the consecutive TTIs from a base station 105 during a downlink transmission, such as a PDSCH transmission, for example. Consecutive TTIs 505 may be preceded by a downlink control channel occasion 510 and followed by an uplink control channel occasion 515. The multi-TTI grant duration 525 may be a duration of time consumed by the consecutive TTIs 505.

In the depicted example, UE 115 may receive, during the downlink control channel occasion 510, a multi-TTI grant 545 that indicates that UE 115 is being granted resources in a set of consecutive TTIs 505 beginning at TTI0 and continuing through TTI7. The granted resources may include at least a portion of a bandwidth and one or more symbol periods of a data channel within each TTI of the consecutive TTIs 505.

Communication timeline 500 further includes control channel occasions 530 interspersed within the duration of the consecutive TTIs 505. In some examples, control channel occasions 530 may provide opportunities for the UE to provide feedback information in the middle of the consecutive TTIs 505; e.g., before the uplink control channel occasion 515. The UE may transmit the feedback information via a control channel (e.g., using PUCCH resources) during one or more control channel occasions 530. A control channel occasion 530 may be one or more symbol periods within a particular TTI 505 in which the UE 115 may transmit feedback information.

Communication timeline 500 includes feedback window 535, which may be a duration of time that begins at the start of the first control channel occasion 530-*a* and finishes at the end of the uplink control channel occasion 515. Thus, feedback window 535 may be a window of time during which a UE may have multiple opportunities to transmit feedback information during one or more control channel occasions 530 or during the uplink control channel occasion 515.

In some examples, feedback window 535 may be offset in time relative to the beginning TTI of the consecutive TTIs by offset 540; that is, feedback window 535 may not begin at the same time as the beginning TTI 505-*a*.

In some examples, a UE 115 may receive (e.g., from a base station 105) an indication of the start of the feedback window 535 and/or a duration of the feedback window. The UE may receive the indication of the start of the feedback window and/or the duration of the feedback window as part of the multi-TTI grant, for example, or via RRC signaling.

As described with respect to FIG. 4, in some cases, feedback information that may be transmitted during a control channel occasion 530 (which may be referred to as reduced feedback) may be a subset of the regular feedback information that may be transmitted during an uplink control channel occasion 515. Such reduced feedback information may consume fewer resources than regular feedback information.

In some examples, if a UE is able to decode a TB in a particular TTI 505, the UE may transmit an ACK during the corresponding control channel occasion 530 or during a subsequent control channel occasion. For example, if a UE is able to decode a TB in TTI2 505-*d*, the UE may transmit an ACK during corresponding control channel occasion 530-*d* or during a subsequent control channel occasion.

In some examples, if a UE is not able to decode a TB in a particular TTI 505, the UE may transmit a NACK during the corresponding control channel occasion or during a subsequent control channel occasion. For example, if a UE is not able to decode a TB in TTI7 505-*h*, the UE may transmit a NACK during corresponding control channel occasion 530-*h* or during a subsequent control channel occasion.

In some examples, a UE 115 may transmit feedback information during a control channel occasion 530 indicating whether all of the TBs in previous TTIs (e.g., in TTIs occurring before the control channel occasion 530) have been successfully or unsuccessfully received. For example, if a UE is able to decode TBs in TTI0 505-*b*, TTI1 505-*c*, and TTI2 505-*d*, the UE may transmit an ACK during control channel occasion 530-*d* (or during a subsequent control channel occasion). Thus, the reduced (light) PUCCH feedback may indicate feedback for each individual TB or it may indicate feedback for all TBs up to the current decoding results. In some cases, such feedback may include a bit sequence that indicates whether each TB in a prior TTI was successfully received; e.g., a sequence of “0,0,1,1” may indicate that the first two TBs were not successfully received and the next two TBs were successfully received.

In some examples, if a UE 115 transmits an ACK within a control channel occasion 530 corresponding to a particular TTI 505, the UE may continue to monitor some or all of the TTIs 505 that occur after the particular TTI in the consecutive TTIs. In this case, the UE 115 may receive additional TBs in one or more subsequent TTIs 505 and may transmit feedback information related to the additional TBs in one or more subsequent control channel occasion(s) 530.

In some cases, it may be advantageous for a UE 115 to have multiple opportunities to provide feedback information to a base station 105 in the middle of the consecutive TTIs 505, to, for example, enable the base station to schedule additional transmissions for the UE 115 or prepare subsequent TBs with more turn-around time.

In some cases, a TB may be segmented into multiple code blocks (CBs) when the TB size is sufficiently large, and a group of CBs may be grouped together to form a code block group (CBG). As discussed in more detail with reference to FIG. 6, in some cases, early feedback in the middle of consecutive TTIs may also provide detailed CBG-level feedback for better feedback granularity such that a base station only needs to retransmit the failed CBGs and does not need to retransmit the successful CBGs. A UE may indicate ACK/NACK feedback for each CBG to allow the base station to retransmit the failed CBGs for better system efficiency.

In some cases, each TTI of the consecutive TTIs 505 is associated with a corresponding control channel occasion 530, such that the number of control channel occasions 530 is the same as the number of TTIs in the consecutive TTIs. In some cases, some TTIs in the set of consecutive TTIs 505 may not be associated with a corresponding control channel occasion 530. For example, the first TTI 505-*a* of the consecutive TTIs 505 may not have a corresponding control channel occasion 530 because the UE may require additional time to switch from receiving the TBs to transmitting feedback.

In some cases, a base station 105 may determine the start of the feedback window 535 (e.g., an earliest control channel occasion) based on the capabilities of the UE 115. A UE 115 may transmit a capability indicator that indicates of one or more of its capabilities to the base station using, for example, RRC signaling. Such capabilities may include, for example, the number of OFDM symbols or time duration required for a UE to switch from receiving data to transmitting feedback. In some cases, the time period from the individual PDSCH to the lighter PUCCH (e.g., a control channel occasion) can follow K1 signaling in PDCCH based on a UE capability report on N1 and N1'.

Figure 6:
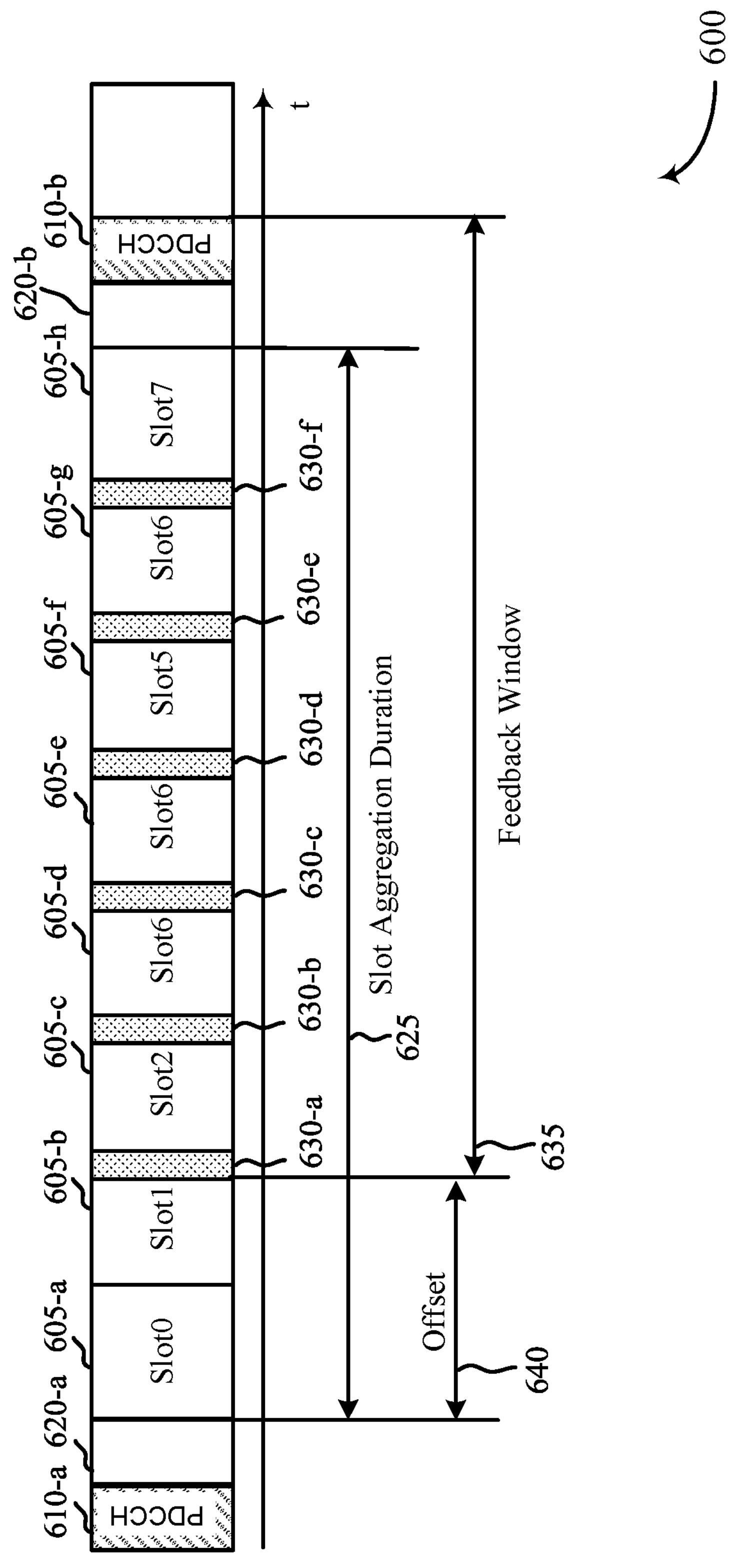
FIG. 6 illustrates an example of a communication timeline in accordance with aspects of the present disclosure.

FIG. 6 illustrates an example communication timeline 600 depicting a timeline for transmitting (e.g., by a UE 115) TBs in a set of aggregated slots 605 and receiving early feedback (e.g., from a base station 105) during a feedback window 635. In some examples, communication timeline 600 may depict communications between a base station (e.g., base station 105) and a UE (e.g., UE 115) as described with reference to FIGS. 1-2.

The UE 115 may transmit the TBs to the base station 105 during an uplink transmission, such as a physical uplink shared channel (PUSCH) transmission, for example. The UE 115 may receive the feedback information in an uplink grant in the middle of the aggregates slots to terminate the remaining uplink transmission from the UE, for example.

The set of aggregated slots 605 may be preceded by a first downlink control channel occasion 610-*a* and followed by a second downlink control channel occasion 610-*b*. The downlink control channel occasions 610 may provide opportunities for the UE 115 to receive downlink control information (DCI) or feedback information from a base station 105 on PDCCH resources, for example. The set of aggregated slots 605 may be consecutive slots used for communication of data (e.g., in TBs) from UE 115 to base station 105. In some cases, the UE 115 may transmit the same TB (or a redundancy version of the same TB) in each of the aggregated slots 605.

Communication timeline 600 further includes control channel occasions 630 interspersed within the slot aggregation duration 625 of the aggregated slots 605. In some examples, control channel occasions 630 may provide opportunities for the UE 115 to receive feedback information from the base station 105 in the middle of the aggregated slots 605; e.g., before the second downlink control channel occasion 610-*b*. The UE may monitor a control channel (e.g., PDCCH) during one or more of the control channel occasions 630, and may receive feedback information from the base station 105 via the control channel (e.g., using PDCCH resources) during one or more of the control channel occasions 630.

Communication timeline 600 includes feedback window 635, which may be a duration of time that begins at the start of the first control channel occasion 630-*a* and finishes at the end of second downlink control channel occasion 610-*b*. Thus, feedback window 635 may be a window of time during which a UE may monitor a downlink control channel (e.g., PDCCH) for feedback during the control channel occasions 630 and during the second downlink control channel occasion 610-*b*. In some examples, feedback window 635 may be offset in time relative to the beginning slot of the set of aggregated slots by offset 660; that is, feedback window 635 may not begin at the same time as the beginning slot 605-*a*.

In some examples, the UE 115 may receive (e.g., from a base station 105) an indication of the start of the feedback window 635 and/or a duration of the feedback window 635. The UE 115 may receive the indication of the start of the feedback window and/or the duration of the feedback window via RRC signaling, for example, or as part of a grant received during the first downlink control channel occasion 610-*a* using PDCCH resources.

In some examples, a UE 115 may transmit, to the base station 105, a capability indicator that indicates the UE 115 capabilities, as described earlier with respect to FIG. 4. In some cases, the start of the feedback window 635 may be based on the UE 115 capabilities.

In some examples, the start of the feedback window 635 may be based on the base station's processing timeline. For example, if the UE 115 is serving as a transmitter and is transmitting TBs to a base station, the start of the feedback window 635 may be based on an amount of time it takes for a base station to attempt to decode a TB and transmit feedback.

In some examples, a UE 115 may receive, from base station 105, feedback information during one or more of the control channel occasions 630 indicating whether a TB was successfully received by the base station 105. In some examples, if the UE 115 receives feedback information during a particular control channel occasion 630 that indicates that the TB was successfully received, the UE 115 may not retransmit the TB in each of the subsequent slots (e.g., slots that occur after the particular control channel occasion 630) of the set of aggregated slots 605; that is, the UE 115 may terminate TB transmission early. In some examples, if the UE 115 receives feedback information during a particular control channel occasion 630 that indicates that the TB was unsuccessfully received, the UE 115 may continue to retransmit the TB in one or more subsequent slots of the set of aggregated slots 605 and not terminate TB transmission early.

In some examples, if early termination is not supported (e.g., by the UE 115 or the base station 105), the UE may be configured to refrain from (e.g., skip) monitoring some or all of the control channel occasions 630.

In some examples, feedback information transmitted by a base station 105 and received by the UE 115 during a control channel occasion 630 may be in a different format than feedback information received during a downlink control channel occasion 610. For example, the PDCCH format (e.g., the format of the grant) for the control channel occasion 630 may be different than the PDCCH format for the downlink control channel occasion 610. In some examples, if a base station successfully decodes an uplink TB, the base station may transmit a subsequent grant in a control channel occasion 630. The grant may have a different format than the initial grant, and may inform the UE that the base station received the TB and is reallocating the resources, such as one or more TTIs of the consecutive TTIs (possibly to a different UE). In some examples, the PDCCH format for the control channel occasion 630 may exclude resource allocation information and/or a TB redundancy number (e.g., RVID), which may be included in the PDCCH format for the downlink control channel occasion 610.

In some examples, a UE 115 may receive TB-level feedback within a downlink control channel occasion 610-*b* that occurs after the set of aggregated slots 605. TB-level feedback may refer to feedback related to an entire TB; e.g., ACK/NACK feedback indicating whether a TB was successfully received.

In some examples, feedback information received during a control channel occasion 630 may include feedback that is at a finer level of granularity than TB-level granularity. For example, feedback information received during a control channel occasion 630 may indicate whether a CBG within a TB or an individual CB within a TB was successfully received. That is, the feedback may include CBG-level feedback and/or CB-level feedback. Such feedback may include, for example, an index indicating to which CBG or CB within a TB the feedback applies. In some cases, such feedback may include a bit sequence indicating whether each CBG or CB of the TB was successfully received. In some examples, a UE 115 may, after receiving CB-level feedback or CBG-level feedback during a control channel occasion 630, determine whether to retransmit a CB or a CBG in a subsequent slot of the aggregated slots 605 based on the feedback.

Figure 7:
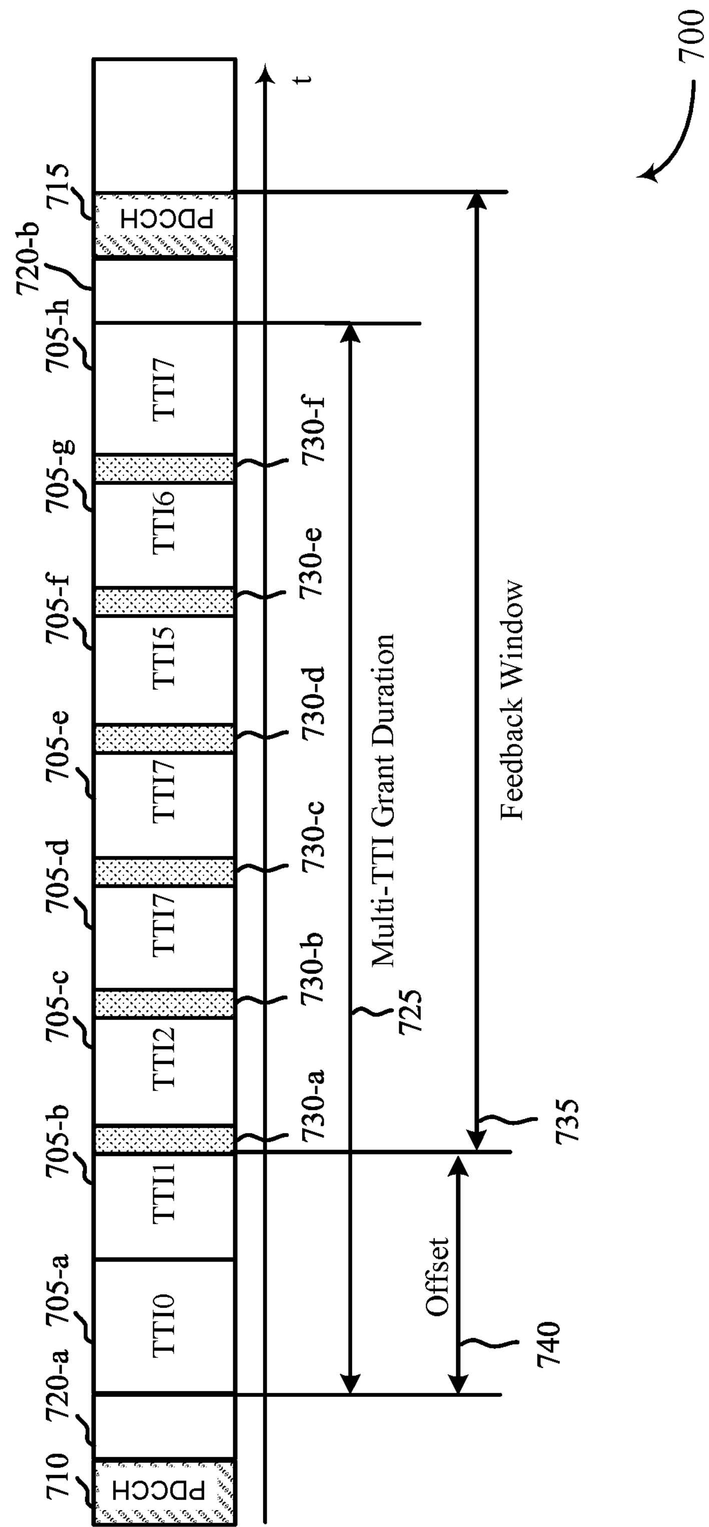
FIG. 7 illustrates an example of a communication timeline in accordance with aspects of the present disclosure.

FIG. 7 illustrates an example communication timeline 700 depicting a timeline for transmitting (e.g., by a UE 115) TBs in consecutive TTIs 705 as part of a multi-TTI grant and receiving early feedback (e.g., from a base station 105) during a feedback window 735. In some examples, communication timeline 700 may depict communications between a base station (e.g., base station 105) and a UE (e.g., UE 115) as described with reference to FIGS. 1-2.

The UE 115 may transmit the TBs to the base station 105 during an uplink transmission, such as a PUSCH transmission, for example. In some examples, the multi-TTI grant may indicate multiple PUSCH transmissions over multiple TTIs.

The consecutive TTIs 705 may be preceded by a first downlink control channel occasion 710-*a* and followed by a second downlink control channel occasion 710-*b*. The downlink control channel occasions 710 may provide opportunities for the UE 115 to receive downlink control information (DCI) or feedback information from a base station 105 on PDCCH resources, for example. The consecutive TTIs 705 may be used for communication of data (e.g., in TBs) from UE 115 to base station 105. In some cases, the UE 115 may transmit a different TB in each of the consecutive TTIs 705.

Communication timeline 700 further includes control channel occasions 730 interspersed within the slot aggregation duration 725 of the consecutive TTIs 705. In some examples, control channel occasions 730 may provide opportunities for the UE 115 to receive feedback information from the base station 105 in the middle of the consecutive TTIs 705; e.g., before the second downlink control channel occasion 710-*b*. The UE may monitor a control channel (e.g., PDCCH) during one or more control channel occasions 730, and may receive feedback information from the base station 105 via the control channel (e.g., using PDCCH resources) during one or more control channel occasions 730. In some examples, the feedback information may be received within an uplink grant from the base station 105.

Communication timeline 700 includes feedback window 735, which may be a duration of time that begins at the start of the first control channel occasion 730-*a* and finishes at the end of second downlink control channel occasion 710-*b*. Thus, feedback window 735 may be a window of time during which a UE may monitor a downlink control channel (e.g., PDCCH) for feedback during the control channel occasions 730 and during the second downlink control channel occasion 710-*b*. In some examples, feedback window 735 may be offset in time relative to the beginning TTI of the consecutive TTIs by offset 770.

In some examples, the UE 115 may receive (e.g., from a base station 105) an indication of the start of the feedback window 735 and/or a duration of the feedback window 735. The UE 115 may receive the indication of the start of the feedback window and/or the duration of the feedback window via RRC signaling, for example, or as part of the multi-TTI grant.

In some examples, a UE 115 may transmit, to the base station 105, a capability indicator that indicates the UE 115 capabilities, as described earlier with respect to FIG. 4. In some cases, the start of the feedback window 735 may be based on the UE 115 capabilities.

In some cases, an uplink grant (e.g., including feedback) received within the feedback window (e.g., received during a control channel occasion 730) may be used to indicate ACK/NACK feedback at a finer level of granularity (e.g., CB-level feedback or CBG-level feedback) for early TBs, while the multi-TTI uplink grant may not be able to provide detailed CBG-level feedback due to the overhead associated with multi-TTI feedback indication. Thus, in some cases, a base station 105 may transmit CBG-level feedback during one or more control channel occasions 730 window for CBG-level indication/(re)transmission and may transmit TB-level feedback during the second downlink control channel occasion 715-*a* that occurs after the consecutive TTIs 705.

Figure 8:
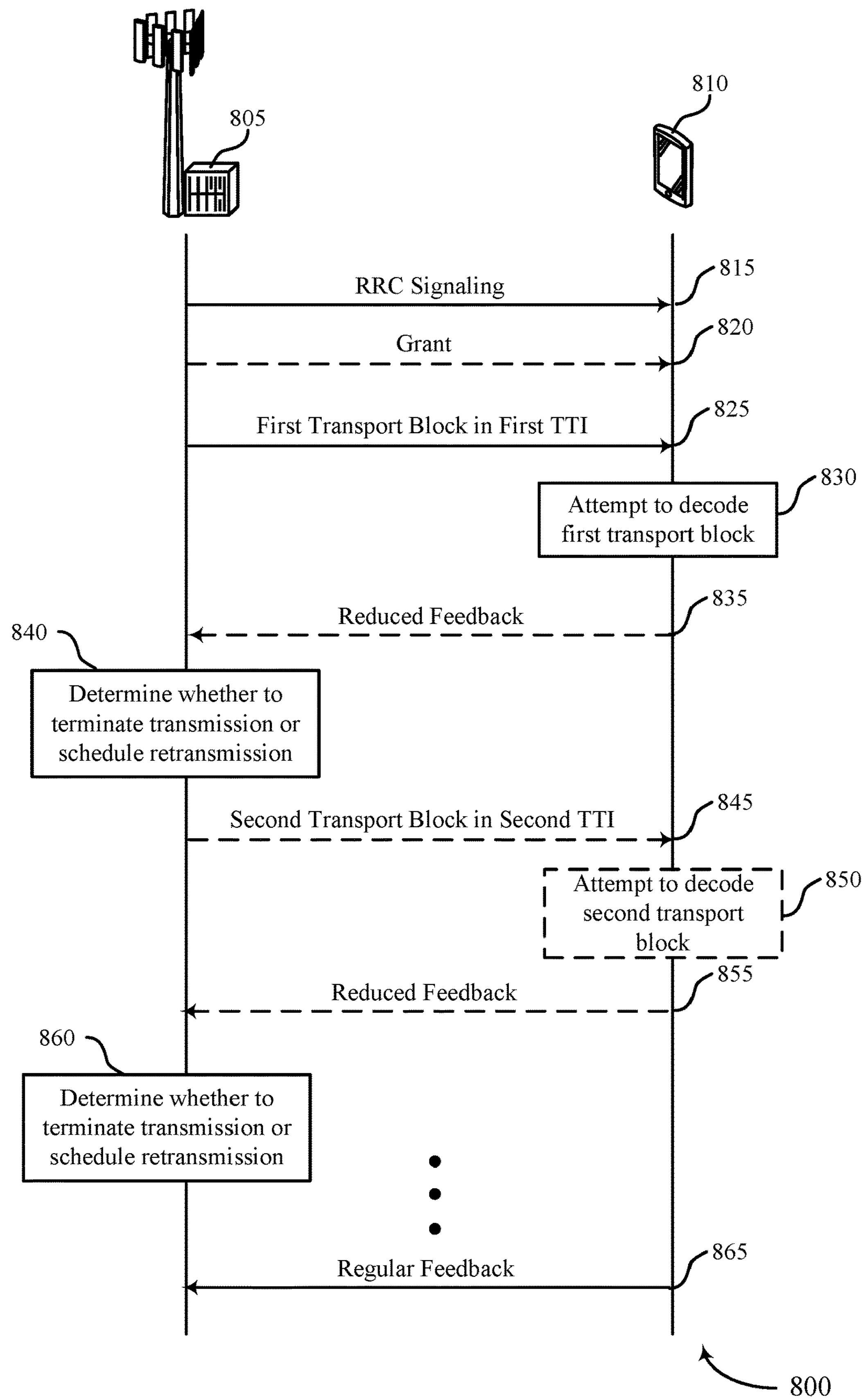
FIG. 8 illustrates an example of a process flow in accordance with aspects of the present disclosure.

FIG. 8 illustrates an example of a process flow 800 in accordance with aspects of the present disclosure. In some cases, process flow 800 may be implemented by aspects of wireless communications systems 100 or 200 as described with reference to FIGS. 1 and 2. In some cases, process flow 800 may represent aspects of techniques performed by one or more receivers or transmitters such as UEs 115 or base stations 105 described with respect to FIGS. 1-7.

At 815, a UE 810 may receive radio resource control (RRC) signaling from a base station 805. In some examples, the RRC signaling may include an indication of a feedback window. Optionally, for communication using aggregated slots, the RRC signaling may include an indication of a slot aggregation duration.

At 820, UE 810 may optionally receive a grant of resources from base station 805; e.g., for a multi-TTI grant. In some examples, the grant may include an indication of a multi-TTI grant duration.

At 825, a UE 810 may receive a first TB in a first TTI. The first TTI may be a first slot of a set of aggregated slots (for slot aggregation), for example, or a first TTI of a set of consecutive TTIs (for multi-TTI grants).

At 830, UE 810 may attempt to decode the TB received at 825.

At 835, UE 810 may transmit reduced feedback information to base station 805. The reduced feedback information may include, for example, ACK/NACK feedback based on whether the UE was able to successfully decode the first TB. Such feedback may include TB-level, CB-level, or CBG-level feedback for the first TB, or delta CSI information that indicates a change in CSI, or may indicate a number of additional TBs (e.g., subsequent TBs with different redundancy versions) that UE 810 needs to receive in order to successfully decode the TB.

At 840, base station 805 may determine, based on the reduced feedback transmitted by UE 810 at 835, whether to terminate transmission of subsequent TBs in the set of consecutive TTIs or schedule retransmission of previously transmitted TBs in the set of consecutive TTIs, for example.

Based on the determination at 840, base station 805 may transmit, at 845, a second TB in a second TTI. The second TTI may be a first slot of a set of aggregated slots (for slot aggregation), for example, or a second TTI of a set of consecutive TTIs (for multi-TTI grants).

UE 810 may receive the second TB from base station 805 and, at 850, UE 810 may attempt to decode the second TB.

At 855, UE 810 may transmit reduced feedback information to base station 805. The reduced feedback information may include, for example, ACK/NACK feedback based on whether the UE was able to successfully decode the first TB, the second TB, or both TBs, which may include TB-level, CB-level, or CBG-level feedback for the first or second TBs, or delta CSI information that indicates a change in CSI, or an indication of a number of additional TBs (e.g., subsequent TBs with different redundancy versions) that UE 810 needs to receive in order to successfully decode the TB.

At 855, base station 805 may determine, based on the reduced feedback transmitted by UE 810 at 855, whether to terminate transmission of subsequent TBs in the set of consecutive TTIs or schedule retransmission of previously transmitted TBs, CBs, or CBGs in a subsequent TTI of the set of consecutive TTIs, for example.

As indicated by the ellipses, in some cases, base station 805 may continue to transmit additional TBs in subsequent TTIs of the set of consecutive TTIs, up to and including the last TTI of the consecutive TTIs. In some cases, base station 805 may terminate transmission early and may not transmit additional TBs.

At 865, which may occur after the last TTI of the set of consecutive TTIs, UE 810 may transmit regular feedback to base station 805. Regular feedback may include TB-level, CBG-level, and/or CB-level ACK/NACK feedback for the TBs received from base station 805, CSI feedback, etc.

Figure 9:
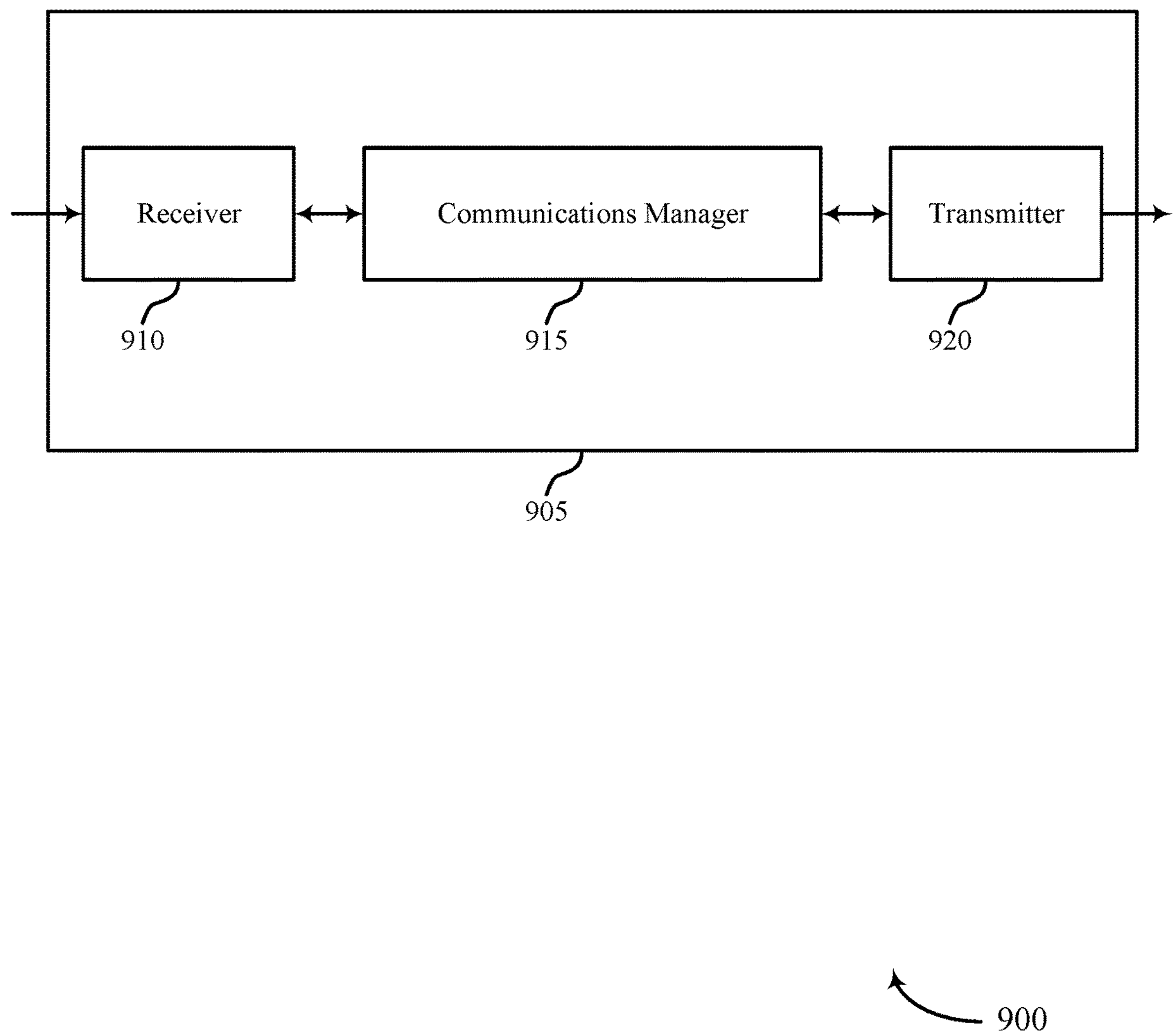
FIGS. 9 and 10 show block diagrams of devices in accordance with aspects of the present disclosure.

FIG. 9 shows a block diagram 900 of a device 905 in accordance with aspects of the present disclosure. The device 905 may be an example of aspects of a UE 115 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to feedback window for providing early feedback for transmissions in a set of consecutive transmission time intervals, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may receive an indicator of a feedback window that is offset relative to a beginning TTI of a set of consecutive TTIs, the feedback window including a set of control channel occasions interspersed within a duration of the set of consecutive TTIs, receive a transport block within a first TTI of the set of consecutive TTIs, and transmit, within a first control channel occasion of the set of control channel occasions, feedback to indicate whether the transport block was successfully received. The communications manager 915 may also receive an indicator of a feedback window that is offset relative to a beginning TTI of a set of consecutive TTIs, the feedback window including a set of control channel occasions interspersed within a duration of the set of consecutive TTIs, transmit a transport block within a first TTI of the set of consecutive TTIs, and receive, within a first control channel occasion of the set of control channel occasions, feedback indicating whether the transport block was successfully received. The communications manager 915 may be an example of aspects of the communications manager 1210 described herein.

The device 905 or other devices described herein (e.g., a UE 115) may provide several advantages. For example, the device 905 may support early feedback that may enable more efficient signaling, better resource utilization, and reduced retransmission latency, among other advantages. For example, if the device 905 successfully receives a TB, the device 905 may not have to wait to transmit feedback (e.g., ACK feedback) until after the last TTI of the set of TTIs, which may enable better resource utilization (e.g., the subsequent TTIs may be used for other communications rather than retransmission of a TB that has already been successfully received). In some examples, if the device 905 does not successfully receive a TB, the device may transmit early feedback (e.g., NACK feedback) that may enable earlier retransmission of at least a portion of the TB in a subsequent TTI, thereby reducing retransmission latency.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a digital signal processor (DSP), an application-specific integrated circuit (ASIC), a field-programmable gate array (FPGA), or other programmable logic device (PLD), discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
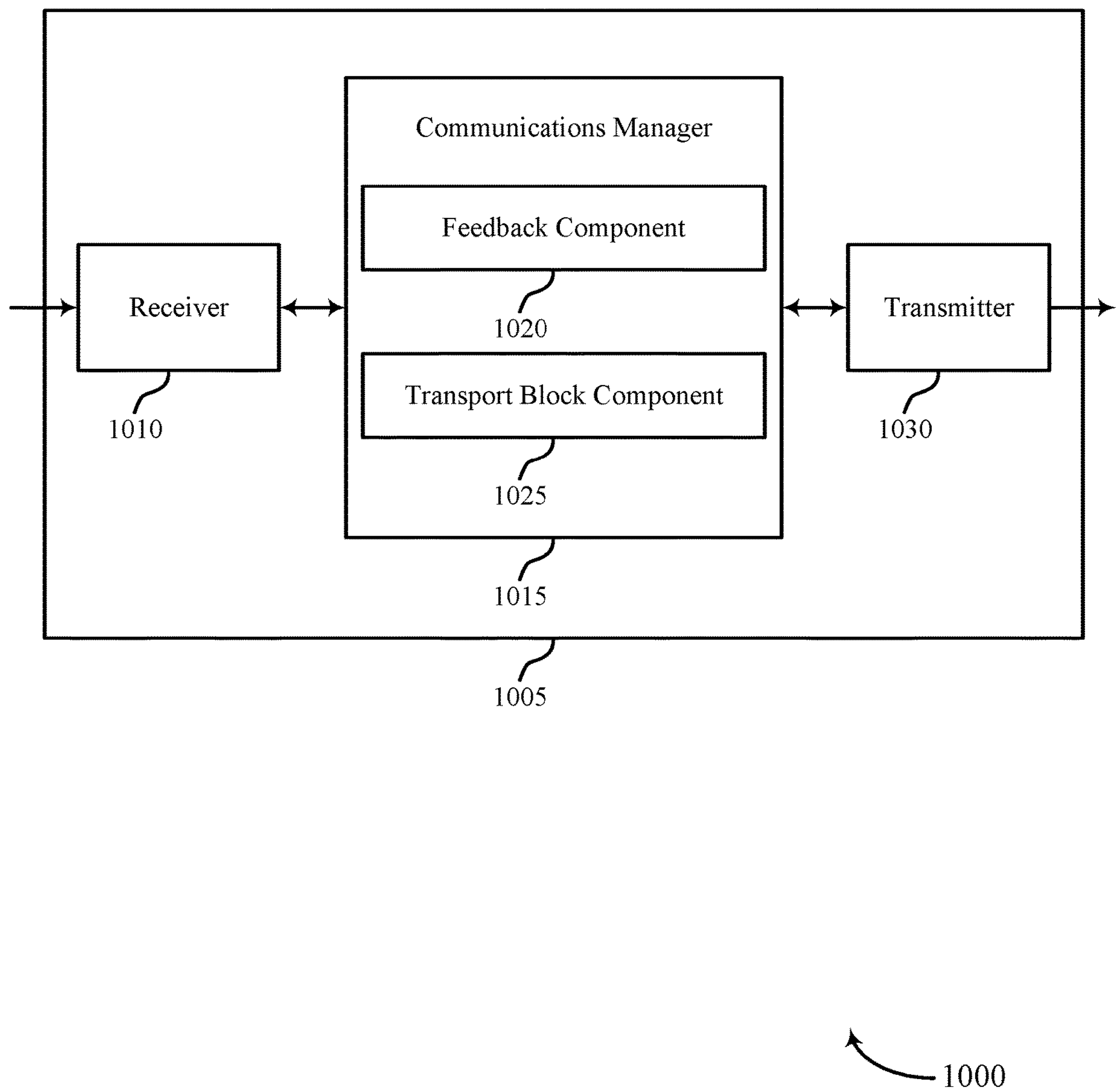

FIG. 10 shows a block diagram 1000 of a device 1005 in accordance with aspects of the present disclosure. The device 1005 may be an example of aspects of a device 905 or a UE 115 as described herein. The device 1005 may include a receiver 1010, a communications manager 1015, and a transmitter 1030. The device 1005 may also include a processor. Each of these components may be in communication with one another (e.g., via one or more buses).

The receiver 1010 may receive information such as packets, user data, or control information associated with various information channels (e.g., control channels, data channels, and information related to feedback window for providing early feedback for transmissions in a set of consecutive transmission time intervals, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a feedback component 1020 and a transport block component 1025. The communications manager 1015 may be an example of aspects of the communications manager 1210 described herein.

The feedback component 1020 may receive an indicator of a feedback window that is offset relative to a beginning TTI of a set of consecutive TTIs, the feedback window including a set of control channel occasions interspersed within a duration of the set of consecutive TTIs and transmit, within a first control channel occasion of the set of control channel occasions, feedback to indicate whether the transport block was successfully received.

The transport block component 1025 may receive a transport block within a first TTI of the set of consecutive TTIs.

The feedback component 1020 may receive an indicator of a feedback window that is offset relative to a beginning TTI of a set of consecutive TTIs, the feedback window including a set of control channel occasions interspersed within a duration of the set of consecutive TTIs and receive, within a first control channel occasion of the set of control channel occasions, feedback indicating whether the transport block was successfully received.

The transport block component 1025 may transmit a transport block within a first TTI of the set of consecutive TTIs.

The transmitter 1030 may transmit signals generated by other components of the device 1005. In some examples, the transmitter 1030 may be collocated with a receiver 1010 in a transceiver module. For example, the transmitter 1030 may be an example of aspects of the transceiver 1220 described with reference to FIG. 12. The transmitter 1030 may utilize a single antenna or a set of antennas.

Figure 11:
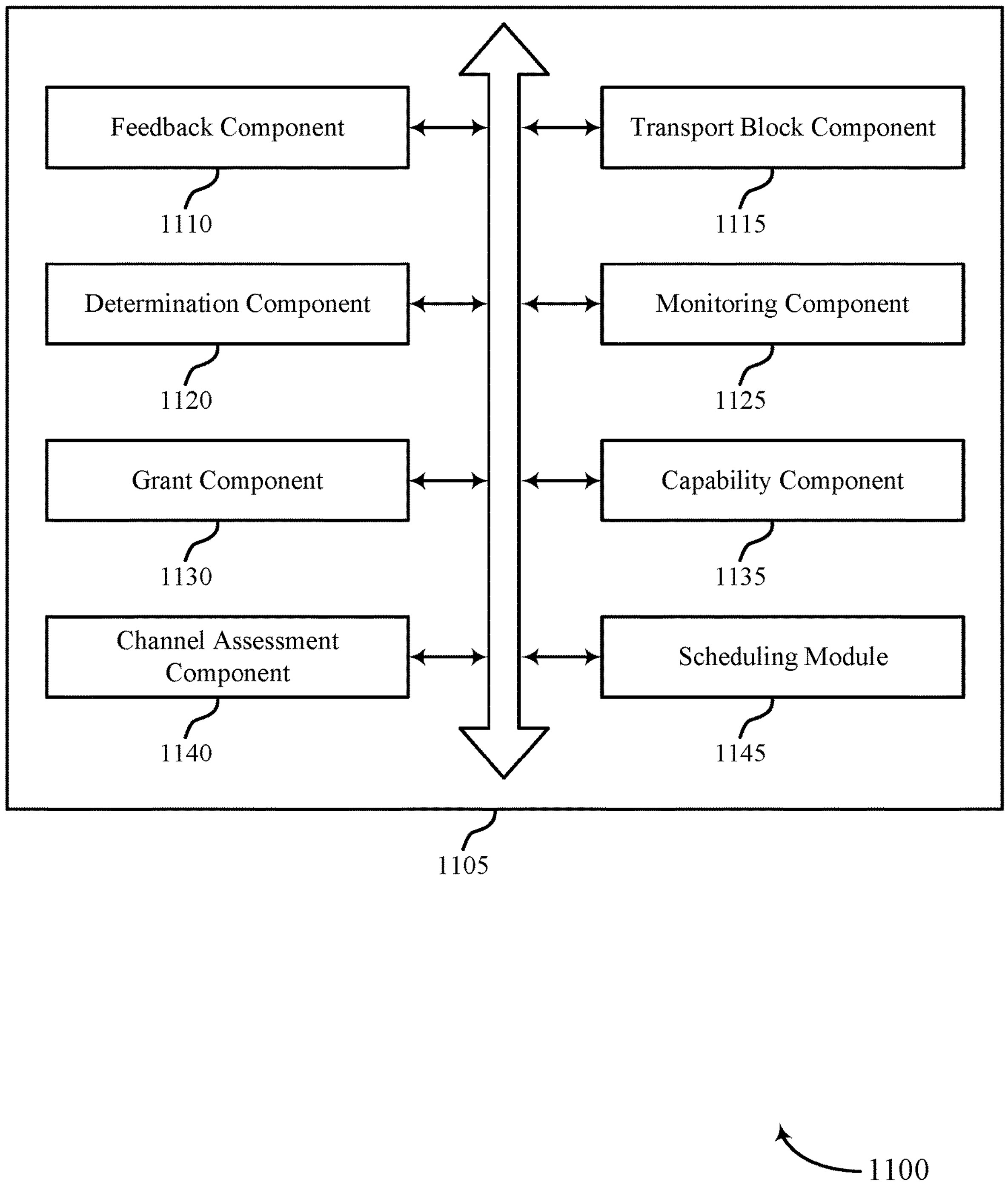
FIG. 11 shows a block diagram of a communications manager in accordance with aspects of the present disclosure.

FIG. 11 shows a block diagram 1100 of a communications manager 1105 in accordance with aspects of the present disclosure. The communications manager 1105 may be an example of aspects of a communications manager 915, a communications manager 1015, or a communications manager 1210 described herein. The communications manager 1105 may include a feedback component 1110, a transport block component 1115, a determination component 1120, a monitoring component 1125, a grant component 1130, a capability component 1135, a channel assessment component 1140, and a scheduling module 1145. Each of these modules may communicate, directly or indirectly, with one another (e.g., via one or more buses).

The feedback component 1110 may receive an indicator of a feedback window that is offset relative to a beginning TTI of a set of consecutive TTIs, the feedback window including a set of control channel occasions interspersed within a duration of the set of consecutive TTIs.

In some examples, the feedback component 1110 may transmit, within a first control channel occasion of the set of control channel occasions, feedback to indicate whether the transport block was successfully received.

In some examples, the feedback component 1110 may receive an indicator of a feedback window that is offset relative to a beginning TTI of a set of consecutive TTIs, the feedback window including a set of control channel occasions interspersed within a duration of the set of consecutive TTIs.

In some examples, the feedback component 1110 may receive, within a first control channel occasion of the set of control channel occasions, feedback indicating whether the transport block was successfully received.

In some examples, the feedback component 1110 may transmit, within a second control channel occasion of the set of control channel occasions that occurs after the first control channel occasion, an acknowledgment to indicate successful receipt of the second transport block.

In some examples, the feedback component 1110 may transmit, within a second control channel occasion of the set of control channel occasions that occurs after to the first control channel occasion, a negative acknowledgment to indicate unsuccessful receipt of the second transport block.

In some examples, the feedback component 1110 may receive a second indicator that indicates the duration of the set of consecutive TTIs, where the set of consecutive TTIs is a set of aggregated TTIs.

In some examples, the feedback component 1110 may transmit delta channel state information within the first control channel occasion.

In some examples, the feedback component 1110 may transmit, within a second control channel occasion of the set of control channel occasions that occurs prior to the first control channel occasion, a negative acknowledgment to indicate unsuccessful receipt of the transport block in a second TTI that occurs prior to the first TTI.

In some examples, the feedback component 1110 may transmit, within a control channel of a TTI occurring after the set of consecutive TTIs, channel state information and second feedback.

In some examples, the feedback component 1110 may receive, within a control channel of a TTI occurring after the set of consecutive TTIs, transport block level feedback for at least one transport block transmitted within the set of consecutive TTIs.

In some cases, the feedback includes an acknowledgment to indicate successful receipt of the transport block.

In some cases, the feedback indicates whether a set of transport blocks including the transport block were successfully received.

In some cases, the feedback includes a negative acknowledgment to indicate unsuccessful receipt of the transport block.

In some cases, the feedback includes code block group-level feedback or code block-level feedback for the transport block.

The transport block component 1115 may receive a transport block within a first TTI of the set of consecutive TTIs.

In some examples, the transport block component 1115 may transmit a transport block within a first TTI of the set of consecutive TTIs.

In some examples, the transport block component 1115 may receive the second transport block in the second TTI.

In some examples, the transport block component 1115 may receive the transport block in a subset of TTIs of the set of consecutive TTIs.

In some examples, the transport block component 1115 may receive a second indicator that associates a respective redundancy version of a set of redundancy versions of the transport block with a respective TTI of the set of consecutive TTIs.

In some examples, the transport block component 1115 may transmit the transport block in each TTI of the set of TTIs that occurs prior to the first control channel occasion.

In some examples, the transport block component 1115 may transmit a second transport block in a second TTI of the set of consecutive TTIs that occurs after the first control channel occasion based on the feedback.

In some examples, the transport block component 1115 may transmit a different redundancy version of the transport block in at least two TTIs of the set of consecutive TTIs.

The determination component 1120 may determine not to transmit the feedback within any subsequent control channel occasion of the set of control channel occasions that occur after the first control channel occasion.

In some examples, the determination component 1120 may determine not to retransmit the transport block in a subsequent TTI of the set of consecutive TTIs based on the feedback.

In some examples, the determination component 1120 may determine to retransmit, within a subsequent TTI of the consecutive set of TTIs, the transport block based on the feedback.

In some examples, the determination component 1120 may determine to retransmit, within a subsequent TTI of the consecutive set of TTIs, at least one code block or code block group of the transport block based on the feedback.

The monitoring component 1125 may discontinue monitoring a second TTI that occurs after the first TTI for the transport block based on the feedback including an acknowledgment. In some examples, the monitoring component 1125 may enable a wireless device (e.g., wireless device 905) to realize one or more potential advantages as described herein. For example, the monitoring component 1125 may enable wireless device 905 to discontinue monitoring after providing early feedback, which may result in beneficial power savings.

In some examples, the monitoring component 1125 may monitor a second TTI of the set of consecutive TTIs that occurs after the first TTI for a second transport block.

In some examples, the monitoring component 1125 may monitor for a different redundancy version of the transport block in at least two TTIs of the set of consecutive TTIs.

The grant component 1130 may receive a grant indicating the beginning TTI of the set of consecutive TTIs and allocation of resources within each TTI of the set of consecutive TTIs.

In some examples, the grant component 1130 may receive a grant indicating the beginning TTI of the set of consecutive TTIs and allocation of resources within each TTI of the set of consecutive TTIs.

The capability component 1135 may transmit a capability indicator to a base station, where a time period between the beginning TTI and a first control channel occasion of the plurality of control channel occasions is based on the capability indicator.

In some examples, the capability component 1135 may transmit a capability indicator to a base station, where a time period between the beginning TTI and a first control channel occasion of the plurality of control channel occasions is based on the capability indicator.

The channel assessment component 1140 may perform clear channel assessment on a shared radio frequency spectrum band prior to transmitting the feedback within the first control channel occasion.

The scheduling module 1145 may schedule to transmit at least two different transport blocks in the set of consecutive TTIs.

Figure 12:
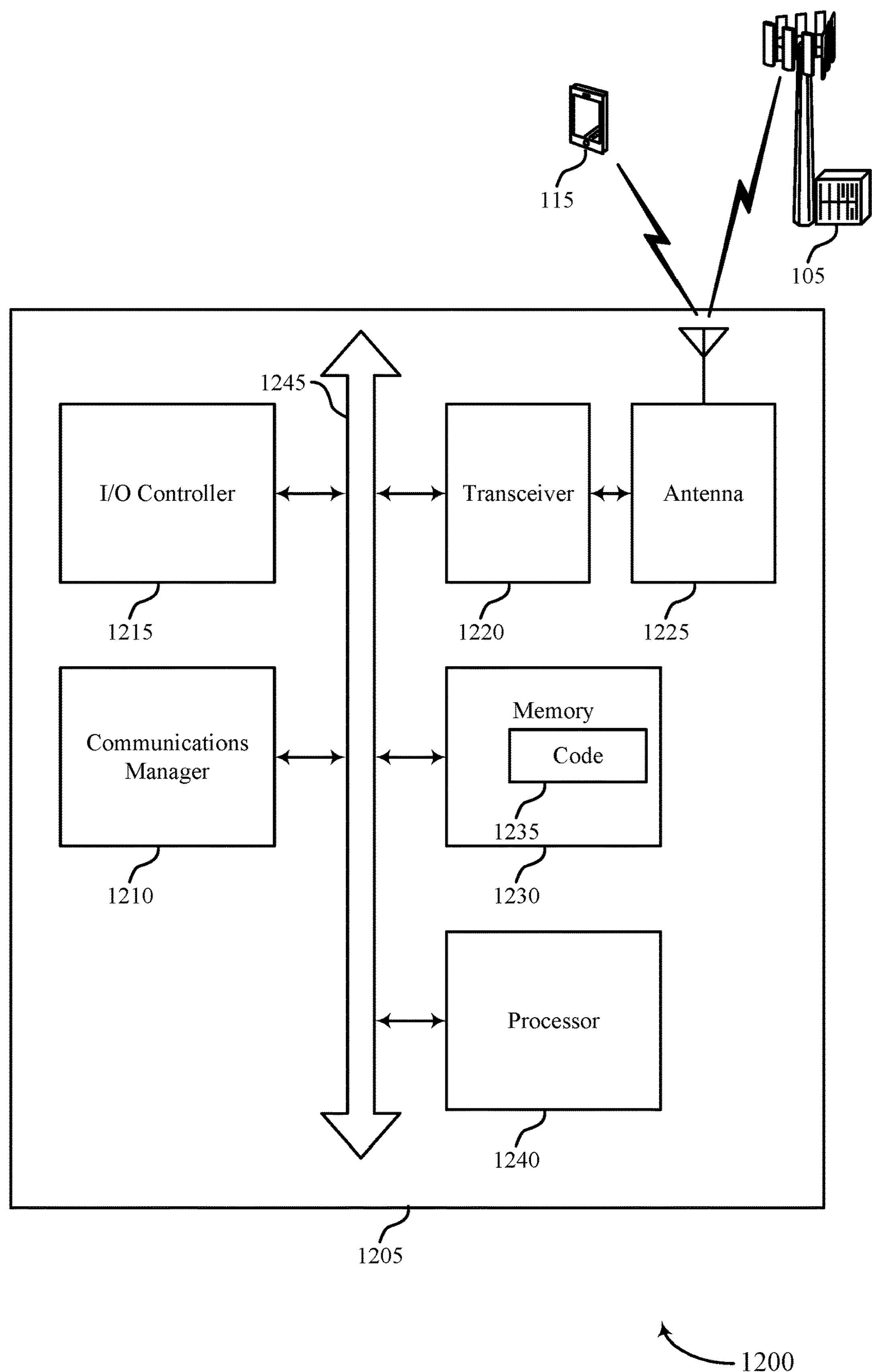
FIG. 12 shows a diagram of a system including a device in accordance with aspects of the present disclosure.

FIG. 12 shows a diagram of a system 1200 including a device 1205 in accordance with aspects of the present disclosure. The device 1205 may be an example of or include the components of device 905, device 1005, or a UE 115 as described herein. The device 1205 may include components for bi-directional voice and data communications including components for transmitting and receiving communications, including a communications manager 1210, an I/O controller 1215, a transceiver 1220, an antenna 1225, memory 1230, and a processor 1240. These components may be in electronic communication via one or more buses (e.g., bus 1245).

The communications manager 1210 may receive an indicator of a feedback window that is offset relative to a beginning TTI of a set of consecutive TTIs, the feedback window including a set of control channel occasions interspersed within a duration of the set of consecutive TTIs, transmit, within a first control channel occasion of the set of control channel occasions, feedback to indicate whether the transport block was successfully received, and receive a transport block within a first TTI of the set of consecutive TTIs. The communications manager 1210 may also receive an indicator of a feedback window that is offset relative to a beginning TTI of a set of consecutive TTIs, the feedback window including a set of control channel occasions interspersed within a duration of the set of consecutive TTIs, receive, within a first control channel occasion of the set of control channel occasions, feedback indicating whether the transport block was successfully received, and transmit a transport block within a first TTI of the set of consecutive TTIs.

The I/O controller 1215 may manage input and output signals for the device 1205. The I/O controller 1215 may also manage peripherals not integrated into the device 1205. In some cases, the I/O controller 1215 may represent a physical connection or port to an external peripheral. In some cases, the I/O controller 1215 may utilize an operating system such as iOS®, ANDROID®, MS-DOS®, MS-WINDOWS®, OS/2®, UNIX®, LINUX®, or another known operating system. In other cases, the I/O controller 1215 may represent or interact with a modem, a keyboard, a mouse, a touchscreen, or a similar device. In some cases, the I/O controller 1215 may be implemented as part of a processor. In some cases, a user may interact with the device 1205 via the I/O controller 1215 or via hardware components controlled by the I/O controller 1215.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include random-access memory (RAM) and read-only memory (ROM). The memory 1230 may store computer-readable, computer-executable code 1235 including instructions that, when executed, cause the processor to perform various functions described herein. In some cases, the memory 1230 may contain, among other things, a basic input/output system (BIOS) which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a PLD, a discrete gate or transistor logic component, a discrete hardware component, or any combination thereof). In some cases, the processor 1240 may be configured to operate a memory array using a memory controller. In other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting feedback window for providing early feedback for transmissions in a set of consecutive transmission time intervals).

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
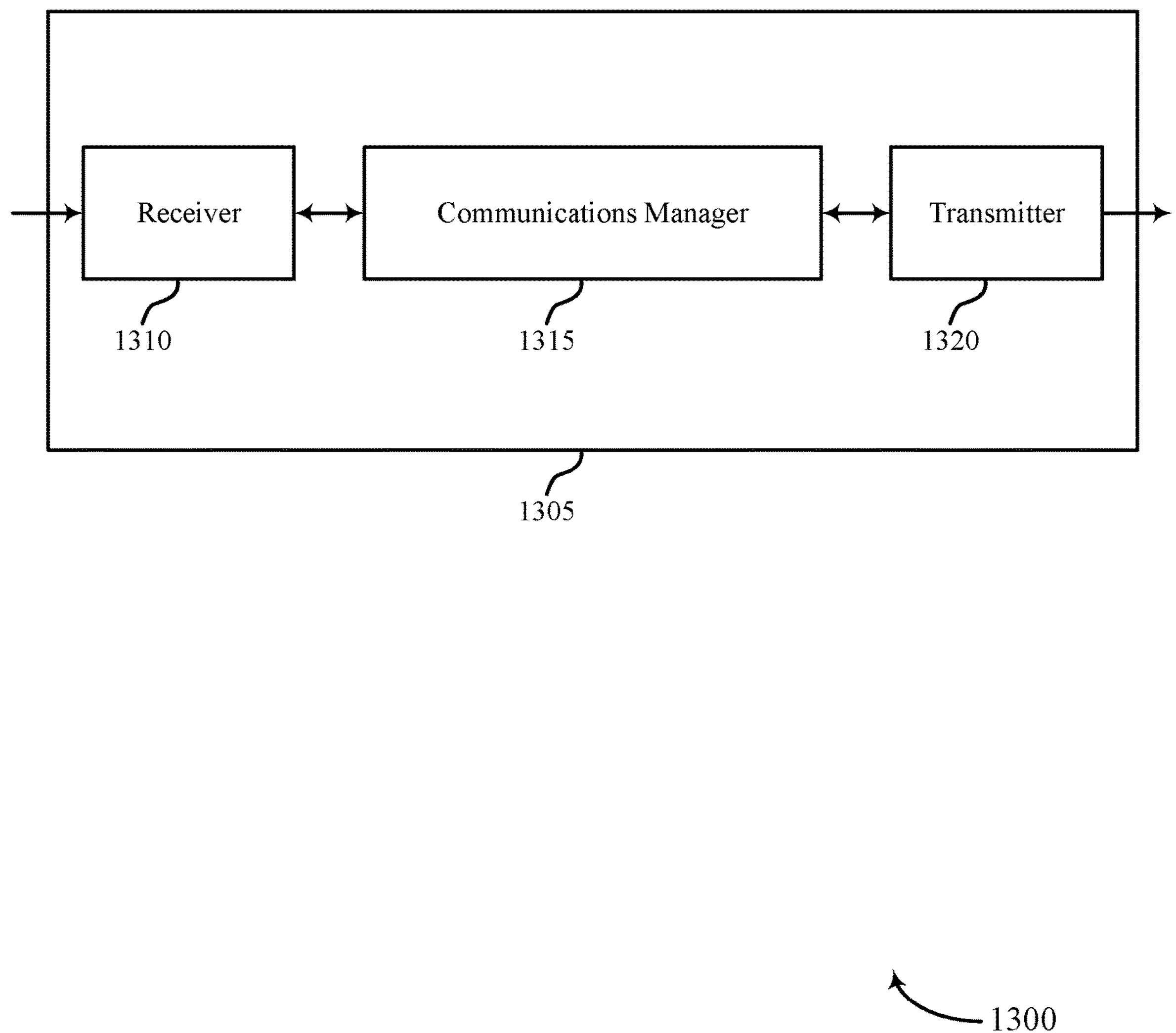
FIGS. 13 and 14 show block diagrams of devices that support a feedback window for providing early feedback for transmissions in a set of consecutive transmission time intervals in accordance with aspects of the present disclosure.

FIG. 13 shows a block diagram 1300 of a device 1305 in accordance with aspects of the present disclosure. The device 1305 may be an example of aspects of a base station 105 as described herein. The device 1305 may include a receiver 1310, a communications manager 1315, and a transmitter 1320. The device 1305 may also include a processor. Each of these components may be in communication with one another (e.g., via one or more buses).

The receiver 1310 may receive information such as packets, user data, or control information associated with various information channels (e.g., control channels, data channels, and information related to feedback window for providing early feedback for transmissions in a set of consecutive transmission time intervals, etc.). Information may be passed on to other components of the device 1305. The receiver 1310 may be an example of aspects of the transceiver 1620 described with reference to FIG. 16. The receiver 1310 may utilize a single antenna or a set of antennas.

The communications manager 1315 may transmit, to a UE, an indicator of a feedback window that is offset relative to a beginning TTI of a set of consecutive TTIs, the feedback window including a set of control channel occasions interspersed within a duration of the set of consecutive TTIs, receive a transport block within a first TTI of the set of consecutive TTIs, and transmit, within a first control channel occasion of the set of control channel occasions, feedback indicating whether the transport block was successfully received. The communications manager 1315 may also transmit, to a UE, an indicator of a feedback window that is offset relative to a beginning TTI of a set of consecutive TTIs, the feedback window including a set of control channel occasions interspersed within a duration of the set of consecutive TTIs, transmit a transport block within a first TTI of the set of consecutive TTIs, and receive, within a first control channel occasion of the set of control channel occasions, feedback to indicate whether the transport block was successfully received. The communications manager 1315 may be an example of aspects of the communications manager 1610 described herein.

The communications manager 1315, or its sub-components, may be implemented in hardware, code (e.g., software or firmware) executed by a processor, or any combination thereof. If implemented in code executed by a processor, the functions of the communications manager 1315, or its sub-components may be executed by a general-purpose processor, a DSP, an ASIC, an FPGA or other PLD, discrete gate or transistor logic, discrete hardware components, or any combination thereof designed to perform the functions described in the present disclosure.

The communications manager 1315, or its sub-components, may be physically located at various positions, including being distributed such that portions of functions are implemented at different physical locations by one or more physical components. In some examples, the communications manager 1315, or its sub-components, may be a separate and distinct component in accordance with various aspects of the present disclosure. In some examples, the communications manager 1315, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1320 may transmit signals generated by other components of the device 1305. In some examples, the transmitter 1320 may be collocated with a receiver 1310 in a transceiver module. For example, the transmitter 1320 may be an example of aspects of the transceiver 1620 described with reference to FIG. 16. The transmitter 1320 may utilize a single antenna or a set of antennas.

Figure 14:
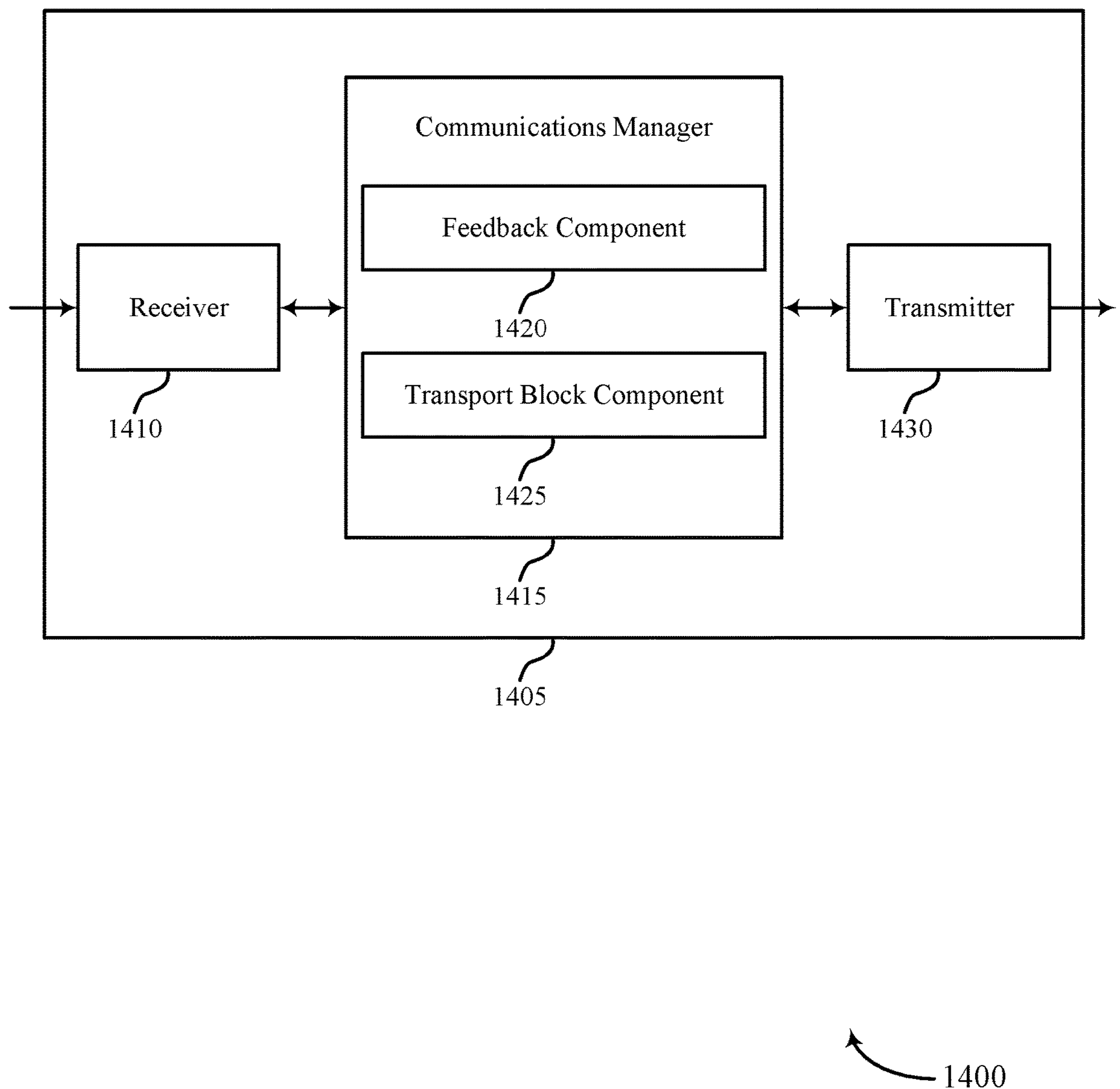

FIG. 14 shows a block diagram 1400 of a device 1405 in accordance with aspects of the present disclosure. The device 1405 may be an example of aspects of a device 1305 or a base station 105 as described herein. The device 1405 may include a receiver 1410, a communications manager 1415, and a transmitter 1430. The device 1405 may also include a processor. Each of these components may be in communication with one another (e.g., via one or more buses).

The receiver 1410 may receive information such as packets, user data, or control information associated with various information channels (e.g., control channels, data channels, and information related to feedback window for providing early feedback for transmissions in a set of consecutive transmission time intervals, etc.). Information may be passed on to other components of the device 1405. The receiver 1410 may be an example of aspects of the transceiver 1620 described with reference to FIG. 16. The receiver 1410 may utilize a single antenna or a set of antennas.

The communications manager 1415 may be an example of aspects of the communications manager 1315 as described herein. The communications manager 1415 may include a feedback component 1420 and a transport block component 1425. The communications manager 1415 may be an example of aspects of the communications manager 1610 described herein.

The feedback component 1420 may transmit, to a UE, an indicator of a feedback window that is offset relative to a beginning TTI of a set of consecutive TTIs, the feedback window including a set of control channel occasions interspersed within a duration of the set of consecutive TTIs and transmit, within a first control channel occasion of the set of control channel occasions, feedback indicating whether the transport block was successfully received.

The transport block component 1425 may receive a transport block within a first TTI of the set of consecutive TTIs.

The feedback component 1420 may transmit, to a UE, an indicator of a feedback window that is offset relative to a beginning TTI of a set of consecutive TTIs, the feedback window including a set of control channel occasions interspersed within a duration of the set of consecutive TTIs and receive, within a first control channel occasion of the set of control channel occasions, feedback to indicate whether the transport block was successfully received.

The transport block component 1425 may transmit a transport block within a first TTI of the set of consecutive TTIs.

The transmitter 1430 may transmit signals generated by other components of the device 1405. In some examples, the transmitter 1430 may be collocated with a receiver 1410 in a transceiver module. For example, the transmitter 1430 may be an example of aspects of the transceiver 1620 described with reference to FIG. 16. The transmitter 1430 may utilize a single antenna or a set of antennas.

Figure 15:
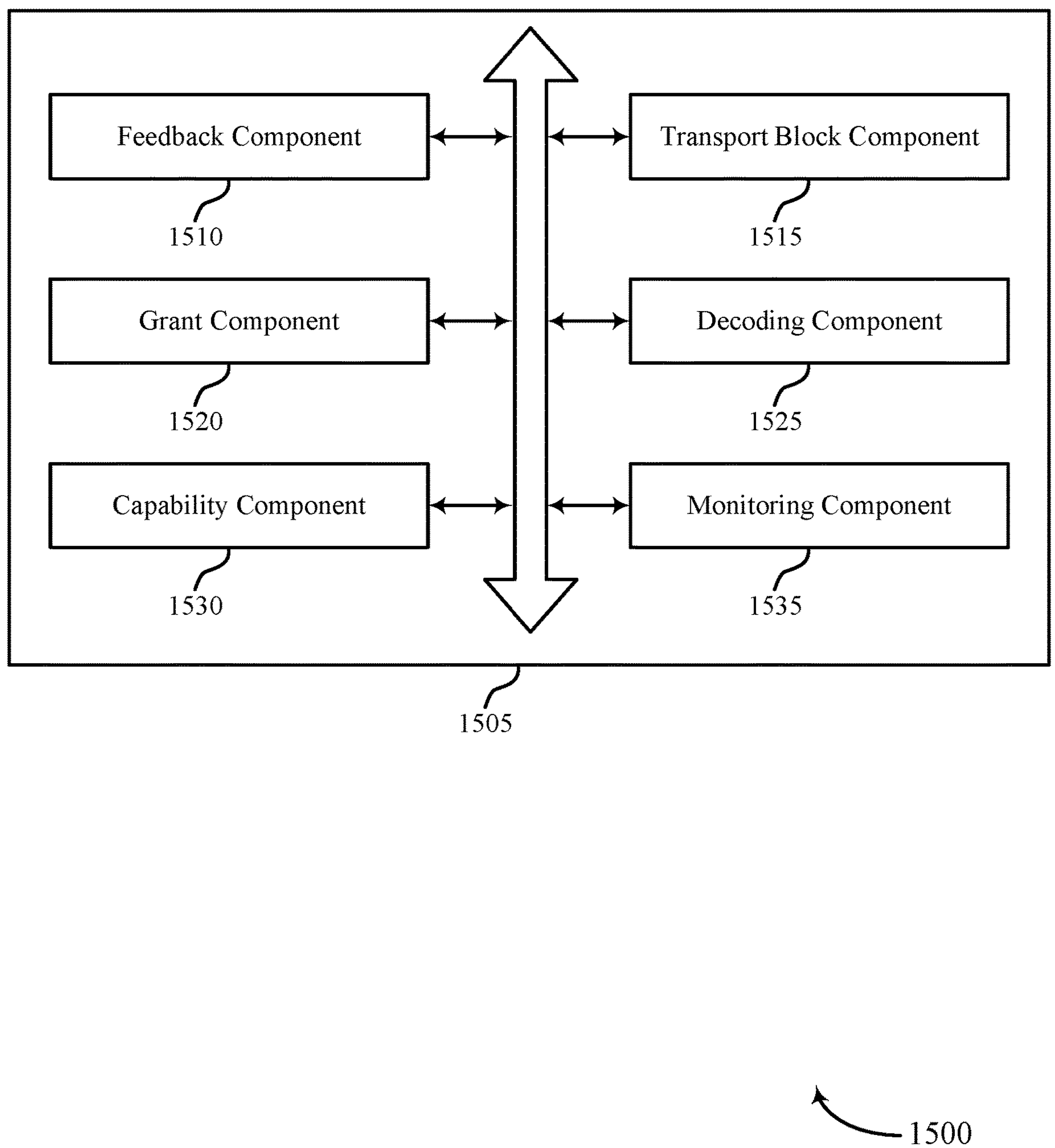
FIG. 15 shows a block diagram of a communications manager in accordance with aspects of the present disclosure.

FIG. 15 shows a block diagram 1500 of a communications manager 1505 in accordance with aspects of the present disclosure. The communications manager 1505 may be an example of aspects of a communications manager 1315, a communications manager 1415, or a communications manager 1610 described herein. The communications manager 1505 may include a feedback component 1510, a transport block component 1515, a grant component 1520, a decoding component 1525, a capability component 1530, and a monitoring component 1535. Each of these modules may communicate, directly or indirectly, with one another (e.g., via one or more buses).

The feedback component 1510 may transmit, to a UE, an indicator of a feedback window that is offset relative to a beginning TTI of a set of consecutive TTIs, the feedback window including a set of control channel occasions interspersed within a duration of the set of consecutive TTIs.

In some examples, the feedback component 1510 may transmit, within a first control channel occasion of the set of control channel occasions, feedback indicating whether the transport block was successfully received. In some examples, the feedback component 1510 may transmit, to a UE, an indicator of a feedback window that is offset relative to a beginning TTI of a set of consecutive TTIs, the feedback window including a set of control channel occasions interspersed within a duration of the set of consecutive TTIs.

In some examples, the feedback component 1510 may receive, within a first control channel occasion of the set of control channel occasions, feedback to indicate whether the transport block was successfully received.

In some examples, the feedback component 1510 may transmit, within a control channel of a TTI occurring after the set of consecutive TTIs, transport block level feedback for at least one transport block transmitted within the set of consecutive TTIs.

In some examples, the feedback component 1510 may receive delta channel state information within the first control channel occasion.

In some examples, the feedback component 1510 may receive, within a second control channel occasion of the set of control channel occasions that occurs prior to the first control channel occasion, a negative acknowledgment to indicate unsuccessful receipt of the transport block in a second TTI that occurs prior to the first TTI.

In some examples, the feedback component 1510 may receive, within a second control channel occasion of the set of control channel occasions, a second feedback to indicate whether the second transport block was successfully received.

In some examples, the feedback component 1510 may receive, within a control channel of a TTI occurring after the set of consecutive TTIs, channel state information feedback and second feedback.

In some cases, the feedback indicates whether a code block or code block group of the transport block was successfully received. In some cases, the feedback includes code block group-level feedback or code block-level feedback for the transport block.

In some cases, the feedback includes an acknowledgment to indicate successful receipt of the transport block. In some cases, the feedback includes a negative acknowledgment to indicate unsuccessful receipt of the transport block.

The transport block component 1515 may receive a transport block within a first TTI of the set of consecutive TTIs.

In some examples, the transport block component 1515 may transmit a transport block within a first TTI of the set of consecutive TTIs. In some examples, the transport block component 1515 may receive a second transport block in a second TTI of the set of consecutive TTIs that occurs after the first TTI.

In some examples, the transport block component 1515 may transmit a second indicator that indicates the duration of the set of consecutive TTIs, where the set of consecutive TTIs is a set of aggregated TTIs. In some examples, the transport block component 1515 may receive a different redundancy version of the transport block in a subset of TTIs of the set of consecutive TTIs.

In some examples, the transport block component 1515 may transmit a second transport block in a second TTI of the set of consecutive TTIs that occurs after the first TTI based on the feedback including an acknowledgement. In some examples, the transport block component 1515 may transmit a second indicator that associates a respective redundancy version of a set of redundancy versions of the transport block with a respective TTI of the set of TTIs. In some examples, the transport block component 1515 may transmit a different redundancy version of the transport block in at least two TTIs of the set of consecutive TTIs.

The grant component 1520 may transmit a grant that includes the feedback, where the grant indicates to terminate transmission of the transport block in at least one TTI of the set of consecutive TTIs that occurs after the first control channel occasion. In some examples, the grant component 1520 may transmit a grant indicating the beginning TTI of the set of consecutive TTIs and allocation of resources within each TTI of the set of consecutive TTIs. In some examples, the grant component 1520 may transmit, to the UE, a grant indicating reallocation of at least one TTI of the set of consecutive TTIs that occurs after the first control channel occasion. In some examples, the grant component 1520 may receive a grant indicating the beginning TTI of the set of consecutive TTIs and allocation of resources within each TTI of the set of consecutive TTIs.

The decoding component 1525 may attempt to decode the transport block in each TTI of the set of TTIs that occurs prior to the first control channel occasion.

The capability component 1530 may receive a capability indicator, where a time period between the beginning TTI and a first control channel occasion of the plurality of control channel occasions is based on the capability indicator.

The monitoring component 1535 may monitor for a different redundancy version of the transport block in at least two TTIs of the set of consecutive TTIs.

Figure 16:
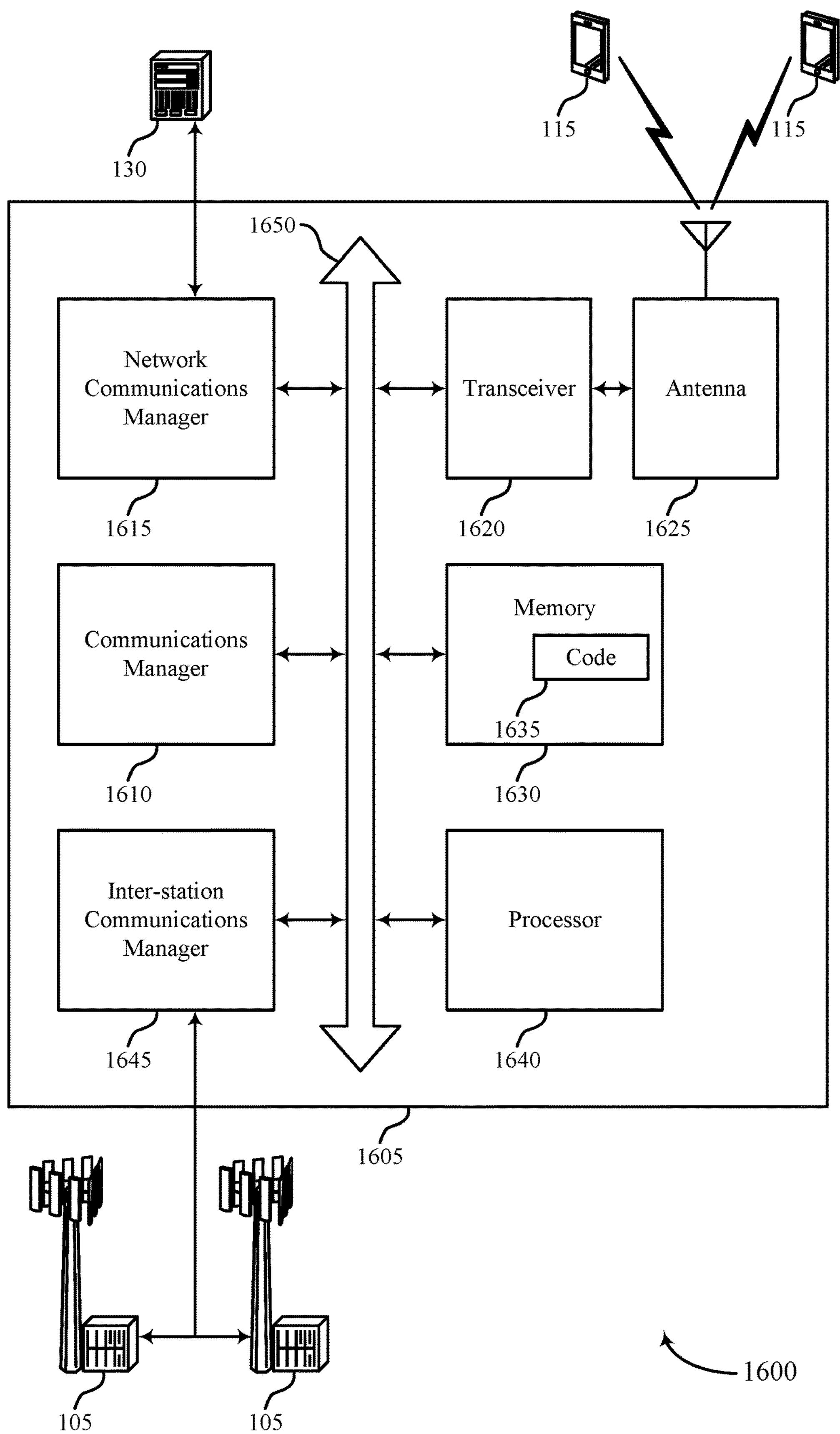
FIG. 16 shows a diagram of a system including a device in accordance with aspects of the present disclosure.

FIG. 16 shows a diagram of a system 1600 including a device 1605 in accordance with aspects of the present disclosure. The device 1605 may be an example of or include the components of device 1305, device 1405, or a base station 105 as described herein. The device 1605 may include components for bi-directional voice and data communications including components for transmitting and receiving communications, including a communications manager 1610, a network communications manager 1615, a transceiver 1620, an antenna 1625, memory 1630, a processor 1640, and an inter-station communications manager 1645. These components may be in electronic communication via one or more buses (e.g., bus 1650).

The communications manager 1610 may transmit, to a UE, an indicator of a feedback window that is offset relative to a beginning TTI of a set of consecutive TTIs, the feedback window including a set of control channel occasions interspersed within a duration of the set of consecutive TTIs, transmit, within a first control channel occasion of the set of control channel occasions, feedback indicating whether the transport block was successfully received, and receive a transport block within a first TTI of the set of consecutive TTIs. The communications manager 1610 may also transmit, to a UE, an indicator of a feedback window that is offset relative to a beginning TTI of a set of consecutive TTIs, the feedback window including a set of control channel occasions interspersed within a duration of the set of consecutive TTIs, receive, within a first control channel occasion of the set of control channel occasions, feedback to indicate whether the transport block was successfully received, and transmit a transport block within a first TTI of the set of consecutive TTIs.

The network communications manager 1615 may manage communications with the core network (e.g., via one or more wired backhaul links). For example, the network communications manager 1615 may manage the transfer of data communications for client devices, such as one or more UEs 115.

The transceiver 1620 may communicate bi-directionally, via one or more antennas, wired, or wireless links as described above. For example, the transceiver 1620 may represent a wireless transceiver and may communicate bi-directionally with another wireless transceiver. The transceiver 1620 may also include a modem to modulate the packets and provide the modulated packets to the antennas for transmission, and to demodulate packets received from the antennas.

In some cases, the wireless device may include a single antenna 1625. However, in some cases the device may have more than one antenna 1625, which may be capable of concurrently transmitting or receiving multiple wireless transmissions.

The memory 1630 may include RAM, ROM, or a combination thereof. The memory 1630 may store computer-readable code 1635 including instructions that, when executed by a processor (e.g., the processor 1640) cause the device to perform various functions described herein. In some cases, the memory 1630 may contain, among other things, a BIOS which may control basic hardware or software operation such as the interaction with peripheral components or devices.

The processor 1640 may include an intelligent hardware device, (e.g., a general-purpose processor, a DSP, a CPU, a microcontroller, an ASIC, an FPGA, a PLD, a discrete gate or transistor logic component, a discrete hardware component, or any combination thereof). In some cases, the processor 1640 may be configured to operate a memory array using a memory controller. In some cases, a memory controller may be integrated into processor 1640. The processor 1640 may be configured to execute computer-readable instructions stored in a memory (e.g., the memory 1630) to cause the device to perform various functions (e.g., functions or tasks supporting feedback window for providing early feedback for transmissions in a set of consecutive transmission time intervals).

The inter-station communications manager 1645 may manage communications with other base station 105, and may include a controller or scheduler for controlling communications with UEs 115 in cooperation with other base stations 105. For example, the inter-station communications manager 1645 may coordinate scheduling for transmissions to UEs 115 for various interference mitigation techniques such as beamforming or joint transmission. In some examples, the inter-station communications manager 1645 may provide an X2 interface within an LTE/LTE-A wireless communication network technology to provide communication between base stations 105.

The code 1635 may include instructions to implement aspects of the present disclosure, including instructions to support wireless communications. The code 1635 may be stored in a non-transitory computer-readable medium such as system memory or other type of memory. In some cases, the code 1635 may not be directly executable by the processor 1640 but may cause a computer (e.g., when compiled and executed) to perform functions described herein.

Figure 17:
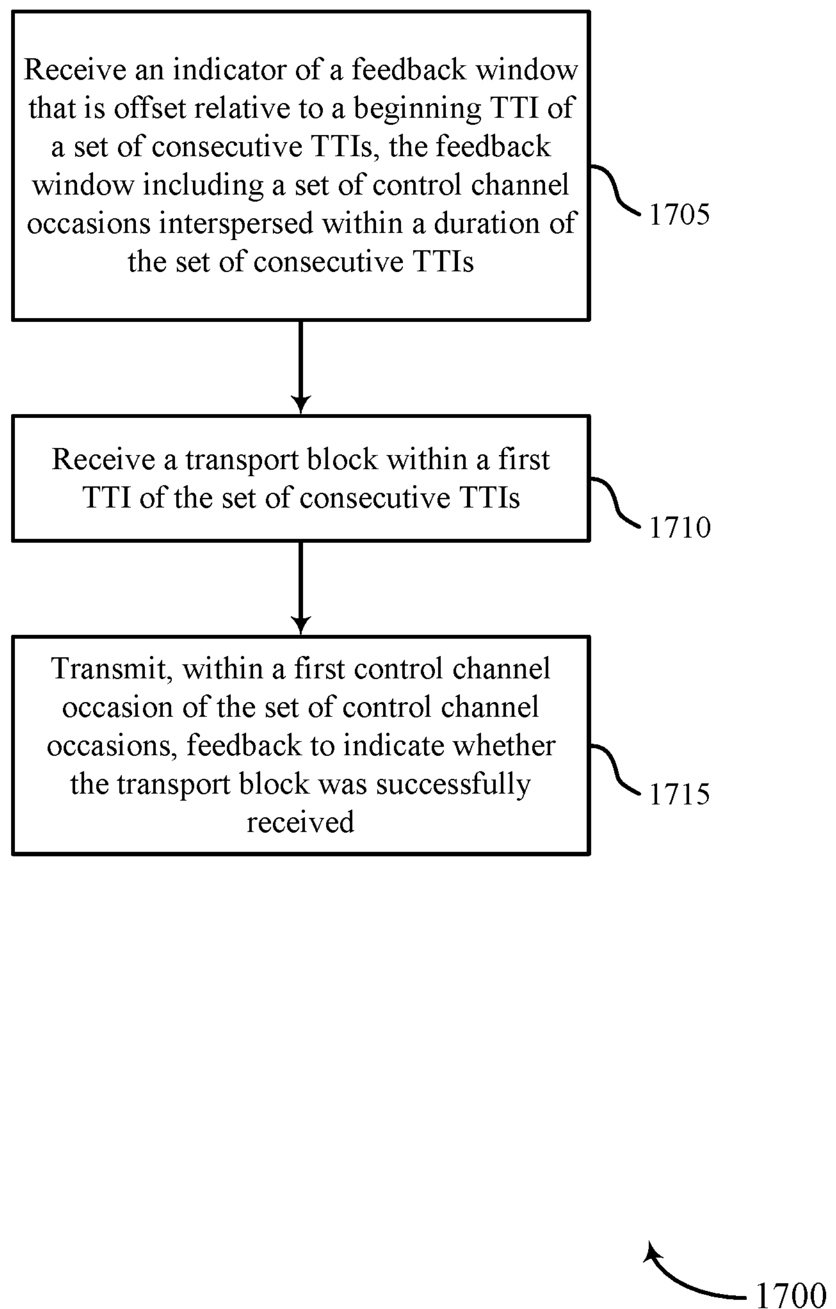
FIGS. 17 through 20 show flowcharts illustrating methods in accordance with aspects of the present disclosure.

FIG. 17 shows a flowchart illustrating a method 1700 in accordance with aspects of the present disclosure. The operations of method 1700 may be implemented by a UE 115 or its components as described herein. For example, the operations of method 1700 may be performed by a communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 1705, the UE may receive an indicator of a feedback window that is offset relative to a beginning TTI of a set of consecutive TTIs, the feedback window including a set of control channel occasions interspersed within a duration of the set of consecutive TTIs. The operations of 1705 may be performed according to the methods described herein. In some examples, aspects of the operations of 1705 may be performed by a Feedback Component as described with reference to FIGS. 9 through 12.

At 1710, the UE may receive a transport block within a first TTI of the set of consecutive TTIs. The operations of 1710 may be performed according to the methods described herein. In some examples, aspects of the operations of 1710 may be performed by a Transport Block Component as described with reference to FIGS. 9 through 12.

At 1715, the UE may transmit, within a first control channel occasion of the set of control channel occasions, feedback to indicate whether the transport block was successfully received. The operations of 1715 may be performed according to the methods described herein. In some examples, aspects of the operations of 1715 may be performed by a Feedback Component as described with reference to FIGS. 9 through 12.

Figure 18:
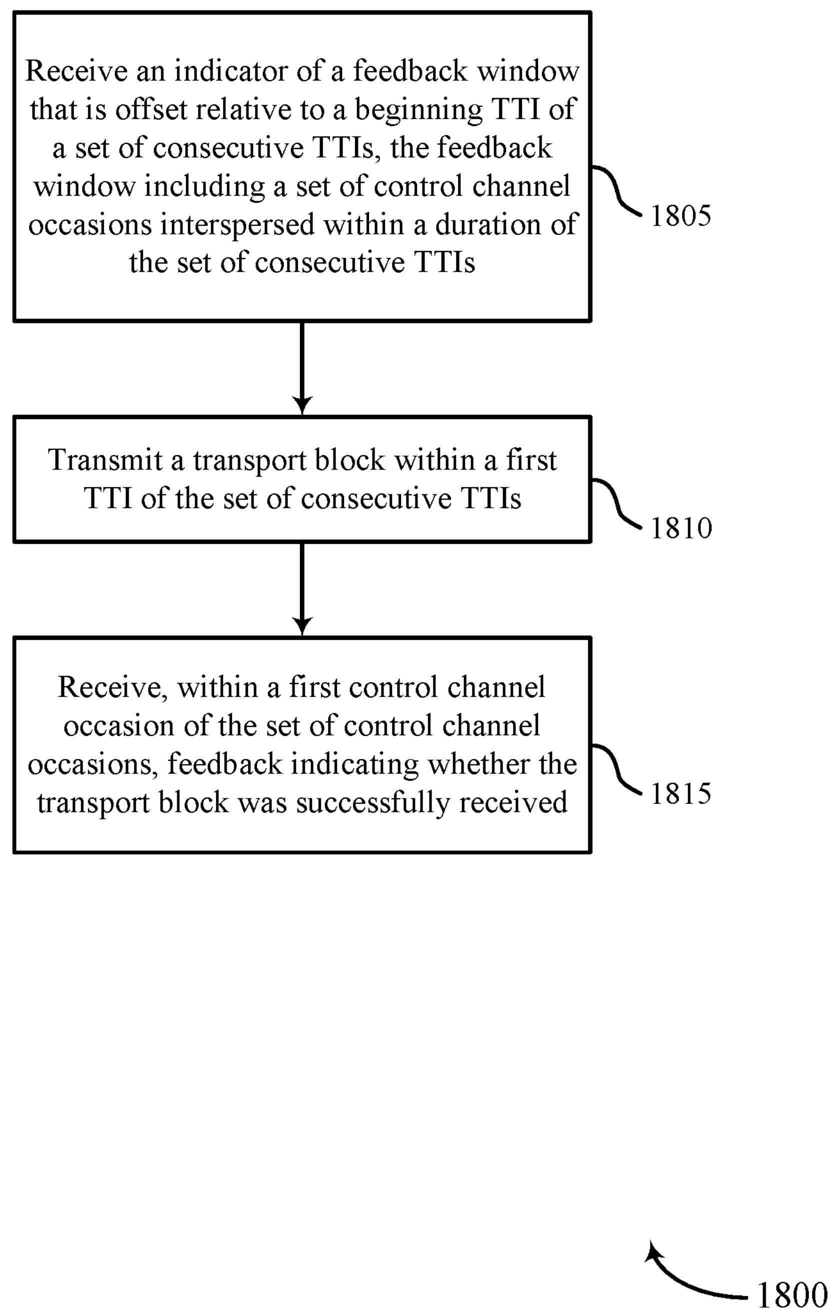

FIG. 18 shows a flowchart illustrating a method 1800 in accordance with aspects of the present disclosure. The operations of method 1800 may be implemented by a UE 115 or its components as described herein. For example, the operations of method 1800 may be performed by a communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 1805, the UE may receive an indicator of a feedback window that is offset relative to a beginning TTI of a set of consecutive TTIs, the feedback window including a set of control channel occasions interspersed within a duration of the set of consecutive TTIs. The operations of 1805 may be performed according to the methods described herein. In some examples, aspects of the operations of 1805 may be performed by a Feedback Component as described with reference to FIGS. 9 through 12.

At 1810, the UE may transmit a transport block within a first TTI of the set of consecutive TTIs. The operations of 1810 may be performed according to the methods described herein. In some examples, aspects of the operations of 1810 may be performed by a Transport Block Component as described with reference to FIGS. 9 through 12.

At 1815, the UE may receive, within a first control channel occasion of the set of control channel occasions, feedback indicating whether the transport block was successfully received. The operations of 1815 may be performed according to the methods described herein. In some examples, aspects of the operations of 1815 may be performed by a Feedback Component as described with reference to FIGS. 9 through 12.

Figure 19:
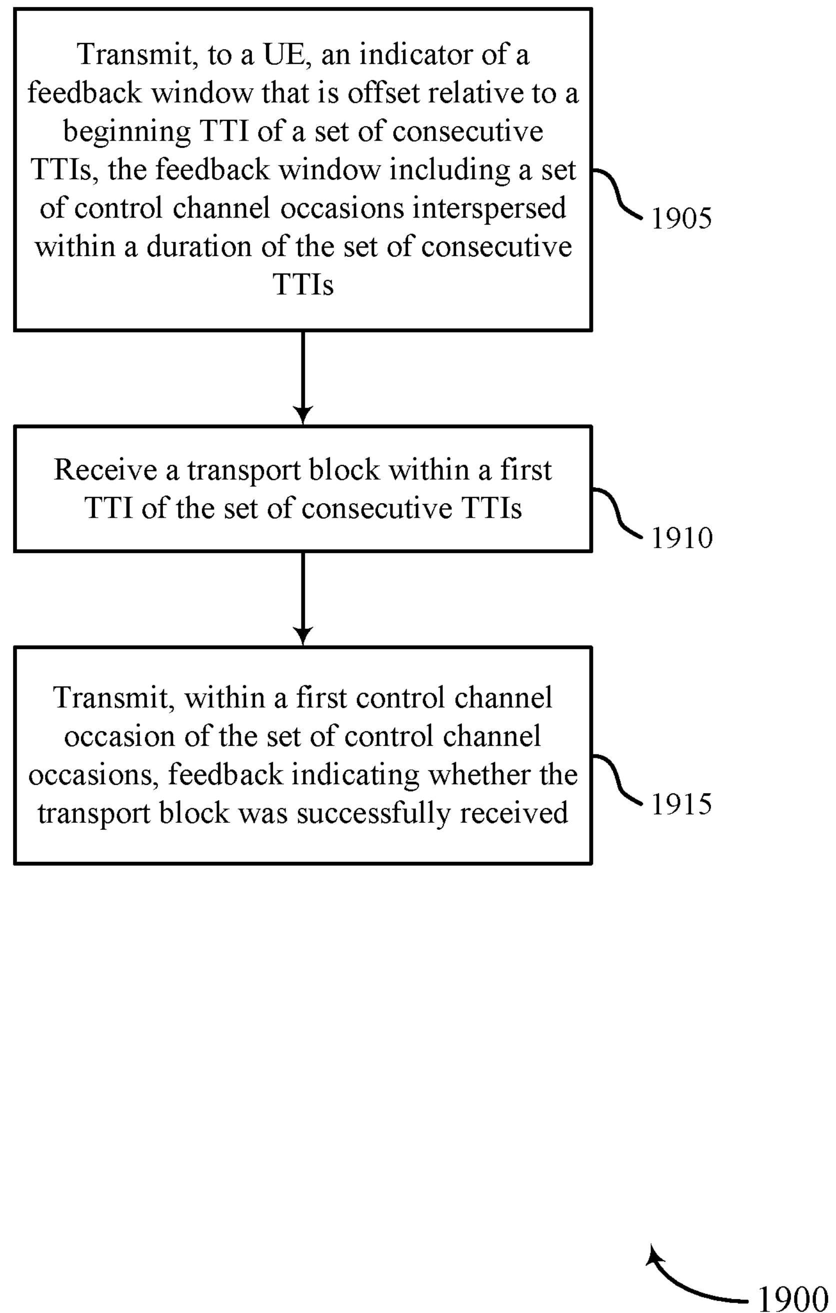

FIG. 19 shows a flowchart illustrating a method 1900 in accordance with aspects of the present disclosure. The operations of method 1900 may be implemented by a base station 105 or its components as described herein. For example, the operations of method 1900 may be performed by a communications manager as described with reference to FIGS. 13 through 16. In some examples, a base station may execute a set of instructions to control the functional elements of the base station to perform the functions described below. Additionally or alternatively, a base station may perform aspects of the functions described below using special-purpose hardware.

At 1905, the base station may transmit, to a UE, an indicator of a feedback window that is offset relative to a beginning TTI of a set of consecutive TTIs, the feedback window including a set of control channel occasions interspersed within a duration of the set of consecutive TTIs. The operations of 1905 may be performed according to the methods described herein. In some examples, aspects of the operations of 1905 may be performed by a Feedback Component as described with reference to FIGS. 13 through 16.

At 1910, the base station may receive a transport block within a first TTI of the set of consecutive TTIs. The operations of 1910 may be performed according to the methods described herein. In some examples, aspects of the operations of 1910 may be performed by a Transport Block Component as described with reference to FIGS. 13 through 16.

At 1915, the base station may transmit, within a first control channel occasion of the set of control channel occasions, feedback indicating whether the transport block was successfully received. The operations of 1915 may be performed according to the methods described herein. In some examples, aspects of the operations of 1915 may be performed by a Feedback Component as described with reference to FIGS. 13 through 16.

Figure 20:
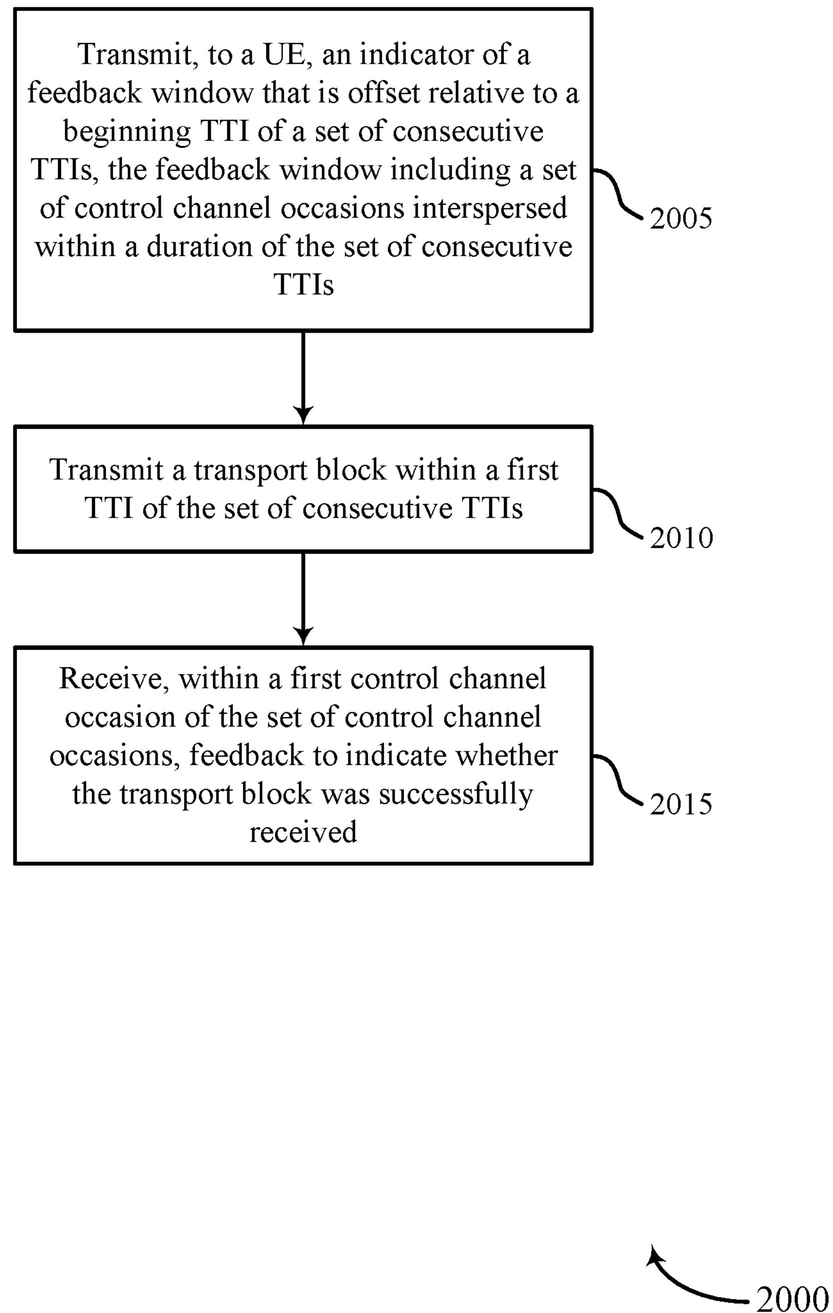

FIG. 20 shows a flowchart illustrating a method 2000 in accordance with aspects of the present disclosure. The operations of method 2000 may be implemented by a base station 105 or its components as described herein. For example, the operations of method 2000 may be performed by a communications manager as described with reference to FIGS. 13 through 16. In some examples, a base station may execute a set of instructions to control the functional elements of the base station to perform the functions described below. Additionally or alternatively, a base station may perform aspects of the functions described below using special-purpose hardware.

At 2005, the base station may transmit, to a UE, an indicator of a feedback window that is offset relative to a beginning TTI of a set of consecutive TTIs, the feedback window including a set of control channel occasions interspersed within a duration of the set of consecutive TTIs. The operations of 2005 may be performed according to the methods described herein. In some examples, aspects of the operations of 2005 may be performed by a Feedback Component as described with reference to FIGS. 13 through 16.

At 2010, the base station may transmit a transport block within a first TTI of the set of consecutive TTIs. The operations of 2010 may be performed according to the methods described herein. In some examples, aspects of the operations of 2010 may be performed by a Transport Block Component as described with reference to FIGS. 13 through 16.

At 2015, the base station may receive, within a first control channel occasion of the set of control channel occasions, feedback to indicate whether the transport block was successfully received. The operations of 2015 may be performed according to the methods described herein. In some examples, aspects of the operations of 2015 may be performed by a Feedback Component as described with reference to FIGS. 13 through 16.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named “3rd Generation Partnership Project” (3GPP). CDMA2000 and UMB are described in documents from an organization named “3rd Generation Partnership Project 2” (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other PLD, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication by a network device, comprising:

transmitting, to a user equipment (UE), a grant indicating a beginning transmission time interval (TTI) of a set of consecutive TTIs and allocation of resources within each TTI of the set of consecutive TTIs;

transmitting, to the UE, an indicator of a feedback window that is offset relative to the beginning TTI of the set of consecutive TTIs, the feedback window comprising a plurality of control channel occasions interspersed within a duration of the set of consecutive TTIs;

receiving a transport block within a first TTI of the set of consecutive TTIs; and transmitting, within a first control channel occasion of the plurality of control channel occasions, feedback indicating whether the transport block was successfully received.

2. The method of claim 1, wherein transmitting the feedback further comprises:

transmitting a grant that comprises the feedback, wherein the grant indicates to terminate transmission of the transport block in at least one TTI of the set of consecutive TTIs that occurs after the first control channel occasion.

3. The method of claim 1, wherein the feedback indicates whether a code block or code block group of the transport block was successfully received.

4. The method of claim 1, further comprising:

attempting to decode the transport block in each TTI of the set of consecutive TTIs that occurs prior to the first control channel occasion.

5. The method of claim 1, further comprising:

monitoring for a different redundancy version of the transport block in at least two TTIs of the set of consecutive TTIs.

6. The method of claim 1, further comprising:

receiving a capability indicator, wherein a time period between the beginning TTI and the first control channel occasion of the plurality of control channel occasions is based at least in part on the capability indicator.

7. The method of claim 1, further comprising:

receiving a second transport block in a second TTI of the set of consecutive TTIs that occurs after the first TTI.

8. The method of claim 1, further comprising:

transmitting, within a control channel of a TTI occurring after the set of consecutive TTIs, transport block level feedback for at least one transport block transmitted within the set of consecutive TTIs.

9. The method of claim 1, wherein the feedback comprises code block group-level feedback or code block-level feedback for the transport block.

10. A method for wireless communication by a network device, comprising:

transmitting, to a user equipment (UE), a grant indicating a beginning transmission time interval (TTI) of a set of consecutive TTIs and allocation of resources within each TTI of the set of consecutive TTIs;

transmitting, to the UE, an indicator of a feedback window that is offset relative to the beginning TTI of the set of consecutive TTIs, the feedback window comprising a plurality of control channel occasions interspersed within a duration of the set of consecutive TTIs;

transmitting a transport block within a first TTI of the set of consecutive TTIs; and receiving, within a first control channel occasion of the plurality of control channel occasions, feedback to indicate whether the transport block was successfully received.

11. The method of claim 10, further comprising:

transmitting a second indicator that associates a respective redundancy version of a plurality of redundancy versions of the transport block with a respective TTI of the set of consecutive TTIs.

12. The method of claim 10, further comprising: transmitting a second indicator that indicates the duration of the set of consecutive TTIs, wherein the set of consecutive TTIs is a set of aggregated TTIs.

13. The method of claim 10, wherein the feedback comprises an acknowledgment to indicate successful receipt of the transport block.

14. The method of claim 10, further comprising: transmitting, to the UE, a grant indicating reallocation of at least one TTI of the set of consecutive TTIs that occurs after the first control channel occasion.

15. The method of claim 10, wherein the feedback comprises a negative acknowledgment to indicate unsuccessful receipt of the transport block.

16. The method of claim 15, further comprising: receiving delta channel state information within the first control channel occasion.

17. The method of claim 10, further comprising: receiving, within a second control channel occasion of the plurality of control channel occasions that occurs prior to the first control channel occasion, a negative acknowledgment to indicate unsuccessful receipt of the transport block in a second TTI that occurs prior to the first TTI.

18. The method of claim 10, further comprising: transmitting a different redundancy version of the transport block in at least two TTIs of the set of consecutive TTIs.

19. The method of claim 10, further comprising: receiving a different redundancy version of the transport block in a subset of TTIs of the set of consecutive TTIs.

20. The method of claim 10, further comprising: transmitting a second transport block in a second TTI of the set of consecutive TTIs that occurs after the first TTI based at least in part on the feedback comprising an acknowledgement.

21. The method of claim 20, further comprising: receiving, within a second control channel occasion of the plurality of control channel occasions, a second feedback to indicate whether the second transport block was successfully received.

22. The method of claim 10, further comprising: receiving, within a control channel of a TTI occurring after the set of consecutive TTIs, channel state information feedback and second feedback.

23. An apparatus for wireless communication by a network device, comprising:

means for transmitting, to a user equipment (UE), a grant indicating a beginning transmission time interval (TTI) of a set of consecutive TTIs and allocation of resources within each TTI of the set of consecutive TTIs;

means for transmitting, to the UE, an indicator of a feedback window that is offset relative to the beginning TTI of the set of consecutive TTIs, the feedback window comprising a plurality of control channel occasions interspersed within a duration of the set of consecutive TTIs;

means for receiving a transport block within a first TTI of the set of consecutive TTIs; and means for transmitting, within a first control channel occasion of the plurality of control channel occasions, feedback indicating whether the transport block was successfully received.

24. The apparatus of claim 23, wherein the means for transmitting the feedback further comprises:

means for transmitting a grant that comprises the feedback, wherein the grant indicates to terminate transmission of the transport block in at least one TTI of the set of consecutive TTIs that occurs after the first control channel occasion.

25. The apparatus of claim 23, wherein the feedback indicates whether a code block or code block group of the transport block was successfully received.

26. An apparatus for wireless communication by a network device, comprising:

a receiver;

a transmitter;

a processor;

memory in electronic communication with the processor; and instructions stored in the memory and executable by the processor to cause the apparatus to:

transmit, to a user equipment (UE), a grant indicating a beginning transmission time interval (TTI) of a set of consecutive TTIs and allocation of resources within each TTI of the set of consecutive TTIs;

transmit, via the transmitter and to the UE, an indicator of a feedback window that is offset relative to the beginning TTI of the set of consecutive TTIs, the feedback window comprising a plurality of control channel occasions interspersed within a duration of the set of consecutive TTIs;

receive, via the receiver, a transport block within a first TTI of the set of consecutive TTIs; and transmit, via the transmitter and within a first control channel occasion of the plurality of control channel occasions, feedback indicating whether the transport block was successfully received.

27. The apparatus of claim 26, wherein the feedback indicates whether a code block or code block group of the transport block was successfully received.

28. The apparatus of claim 26, wherein the instructions to transmit the feedback further are executable by the processor to cause the apparatus to:

transmit a grant that comprises the feedback, wherein the grant indicates to terminate transmission of the transport block in at least one TTI of the set of consecutive TTIs that occurs after the first control channel occasion.

* * * * *